(12) United States Patent
Hara et al.

(10) Patent No.: US 7,836,332 B2
(45) Date of Patent: Nov. 16, 2010

(54) METHOD AND APPARATUS FOR MANAGING VIRTUAL PORTS ON STORAGE SYSTEMS

(75) Inventors: Junichi Hara, San Jose, CA (US); Yoshiki Kano, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 569 days.

(21) Appl. No.: 11/826,717

(22) Filed: Jul. 18, 2007

(65) Prior Publication Data
US 2009/0025007 A1 Jan. 22, 2009

(51) Int. Cl.
*G06F 11/00* (2006.01)
(52) U.S. Cl. .............................. 714/5; 714/4
(58) Field of Classification Search ............... None
See application file for complete search history.

(56) References Cited

U.S. PATENT DOCUMENTS

| | | | |
|---|---|---|---|
| 6,779,083 B2 | 8/2004 | Ito et al. | |
| 6,907,498 B2 | 6/2005 | Kitamura et al. | |
| 7,305,591 B2 * | 12/2007 | Do et al. | 714/43 |
| 7,457,861 B1 * | 11/2008 | Ebersole et al. | 709/223 |
| 7,467,191 B1 * | 12/2008 | Wang et al. | 709/221 |
| 2003/0172149 A1 * | 9/2003 | Edsall et al. | 709/224 |
| 2004/0054866 A1 * | 3/2004 | Blumenau et al. | 711/202 |
| 2007/0058619 A1 * | 3/2007 | Gowda et al. | 370/386 |
| 2008/0114961 A1 * | 5/2008 | Ramaswamy et al. | 711/170 |

* cited by examiner

*Primary Examiner*—Michael C Maskulinski
(74) *Attorney, Agent, or Firm*—Mattingly & Malur, P.C.

(57) ABSTRACT

A storage system is configured to create and manage virtual ports on physical ports. The storage system can transfer associations between virtual ports and physical ports when a failure occurs in a physical port or a link connected to the physical port so that a host can access volumes under the virtual ports through another physical port. The storage system can also change associations between virtual ports and physical ports by taking into account the relative loads on the physical ports. When a virtual machine is migrated from one host computer to another, the loads on the physical ports in the storage system can be used to determine whether load balancing should take place. Additionally, the storage system can transfer virtual ports to a remote storage system that will take over the virtual ports, so that a virtual machine can be migrated to remote location.

14 Claims, 27 Drawing Sheets

Conceptual Diagram of 1st Embodiment
after Link Failure and Port Reassignment

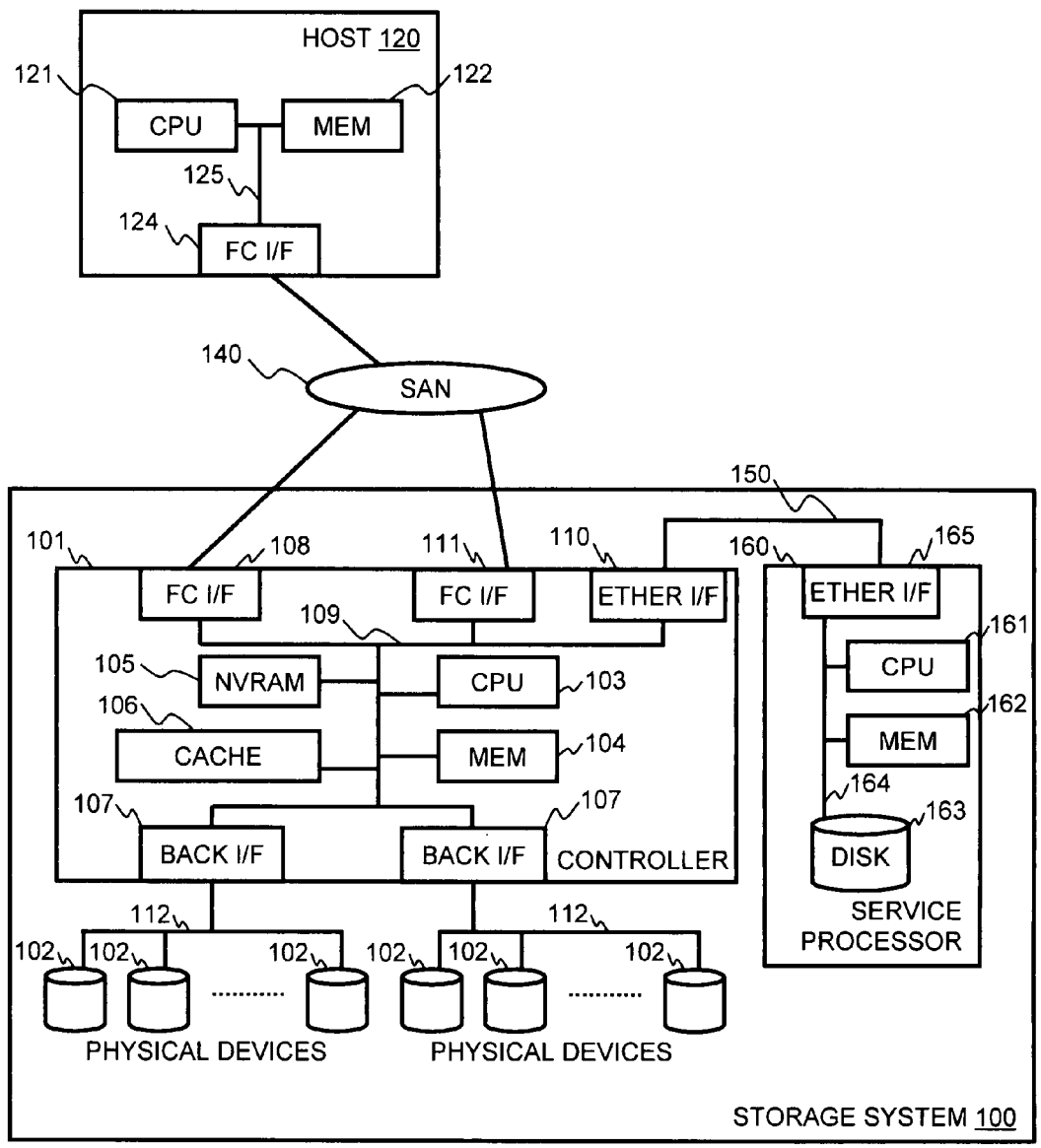
FIG. 1 System Configuration of 1st embodiment

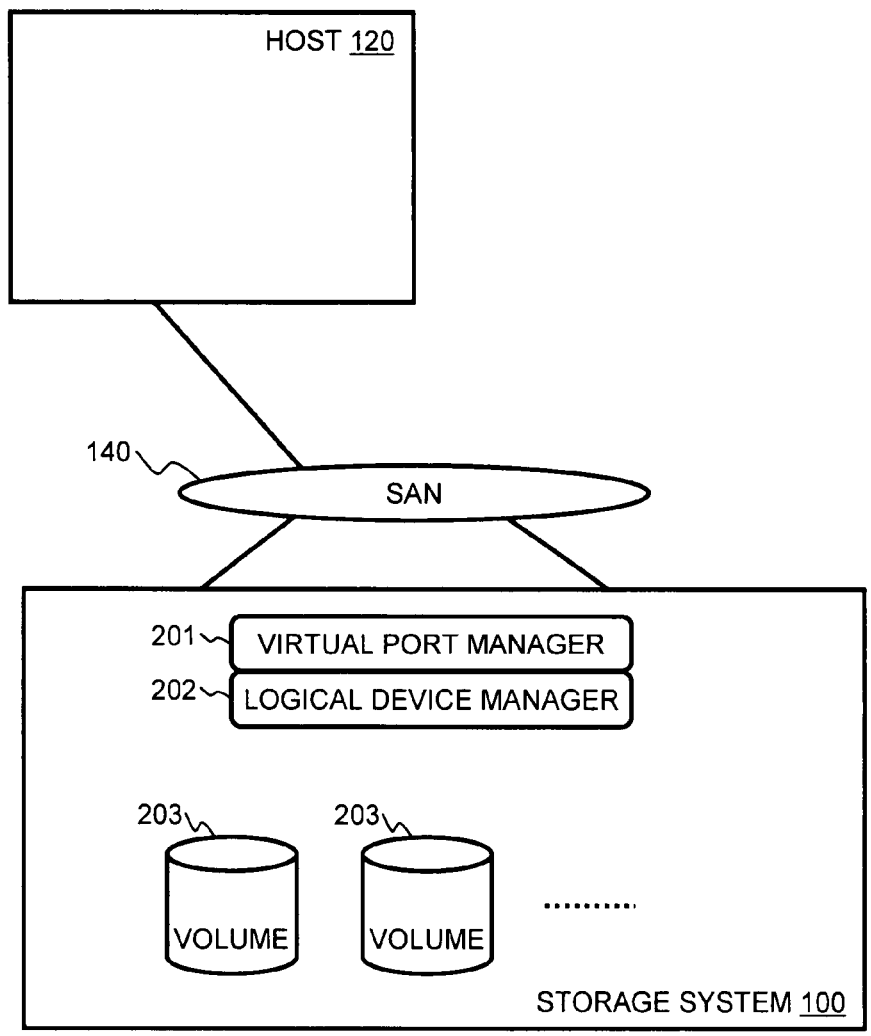
FIG. 2 Software Module Configuration of 1st Embodiment

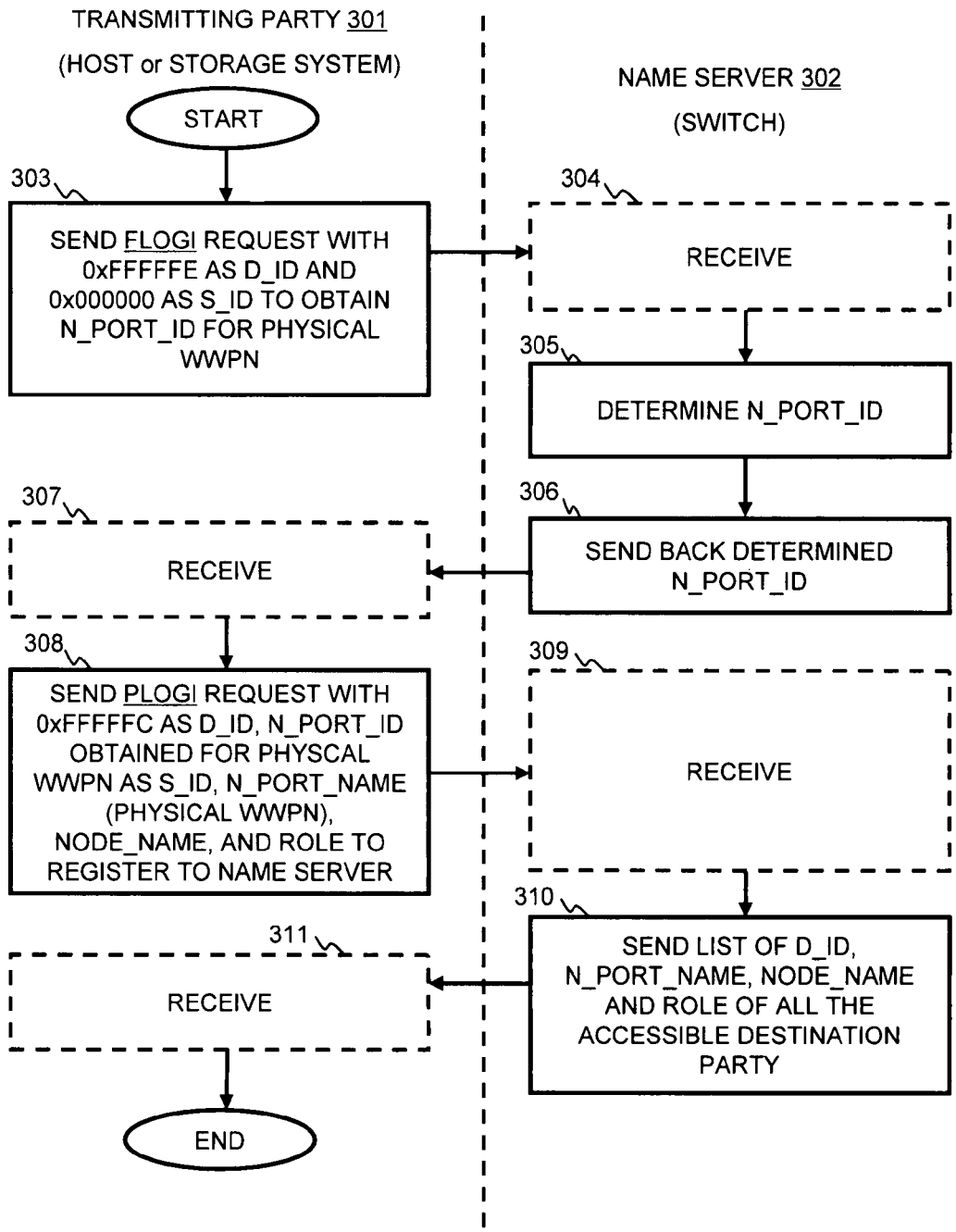
FIG. 3 Fabric Login Procedure for Physical Port
(Related Art)

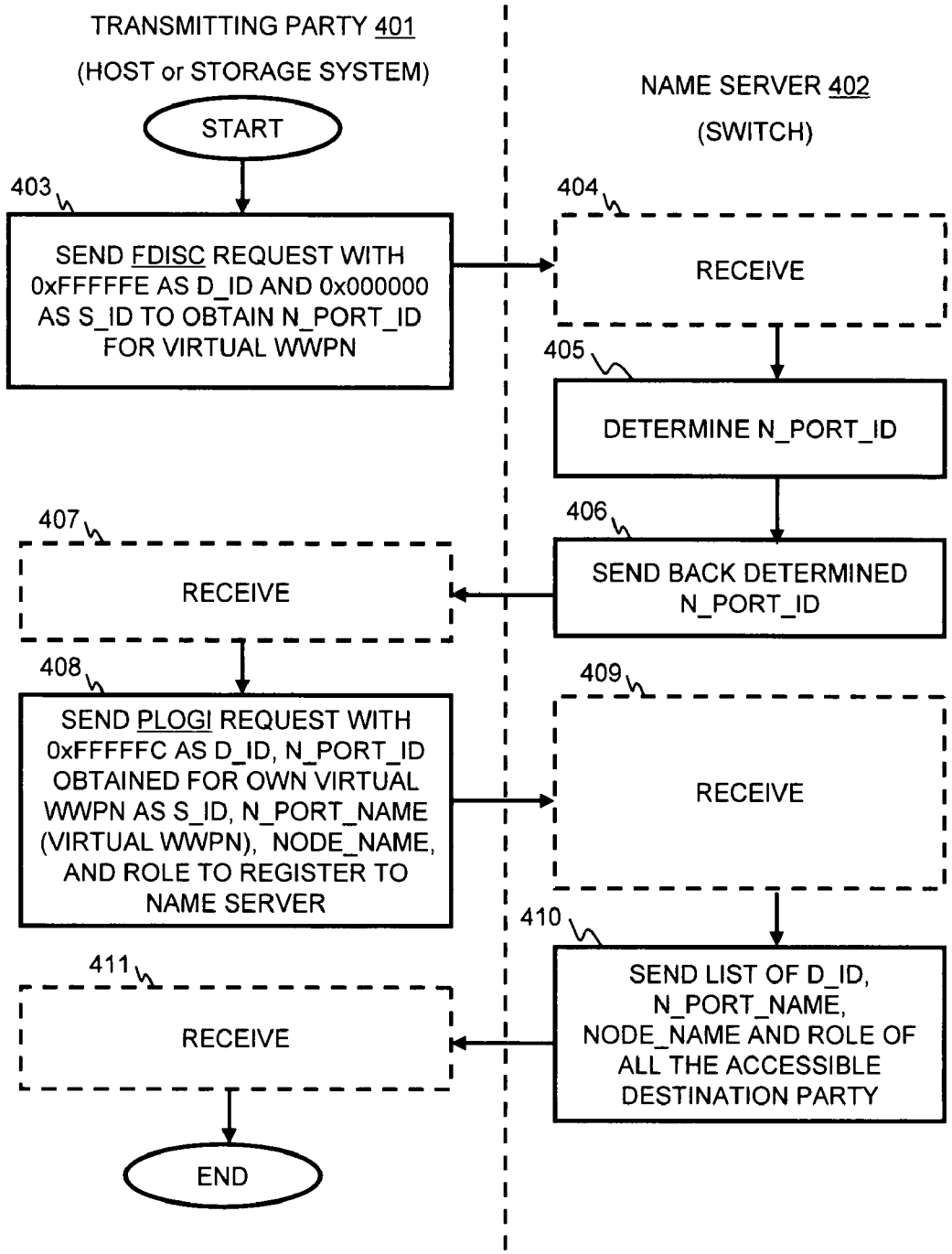
FIG. 4 Fabric Login Procedure for Virtual Port
(Related Art)

| GROUP | PHYSICAL WWPN | STATUS | VIRTUAL WWPN | N_PORT_ID | EXPORTED VOLUME |
|---|---|---|---|---|---|
| GROUP_1 | 0123456789ABCDP0 (WWPN_1) | OK | - | FFFF00 (N_PORT_ID_1) | |
| | | | 0123456789ABCDV0 (WWPN_V1) | FFFF01 (N_PORT_ID_V1) | VOL_A, VOL_B, VOL_C |
| | | | 0123456789ABCDV1 (WWPN_V2) | FFFF02 (N_PORT_ID_V2) | VOL_D, VOL_E, VOL_F |
| | 0123456789ABCDP1 (WWPN_2) | OK | - | FFFF03 (N_PORT_ID_2) | |
| ......... | ......... | ......... | ......... | ......... | ......... |

FIG. 5 Virtual Port Management Table

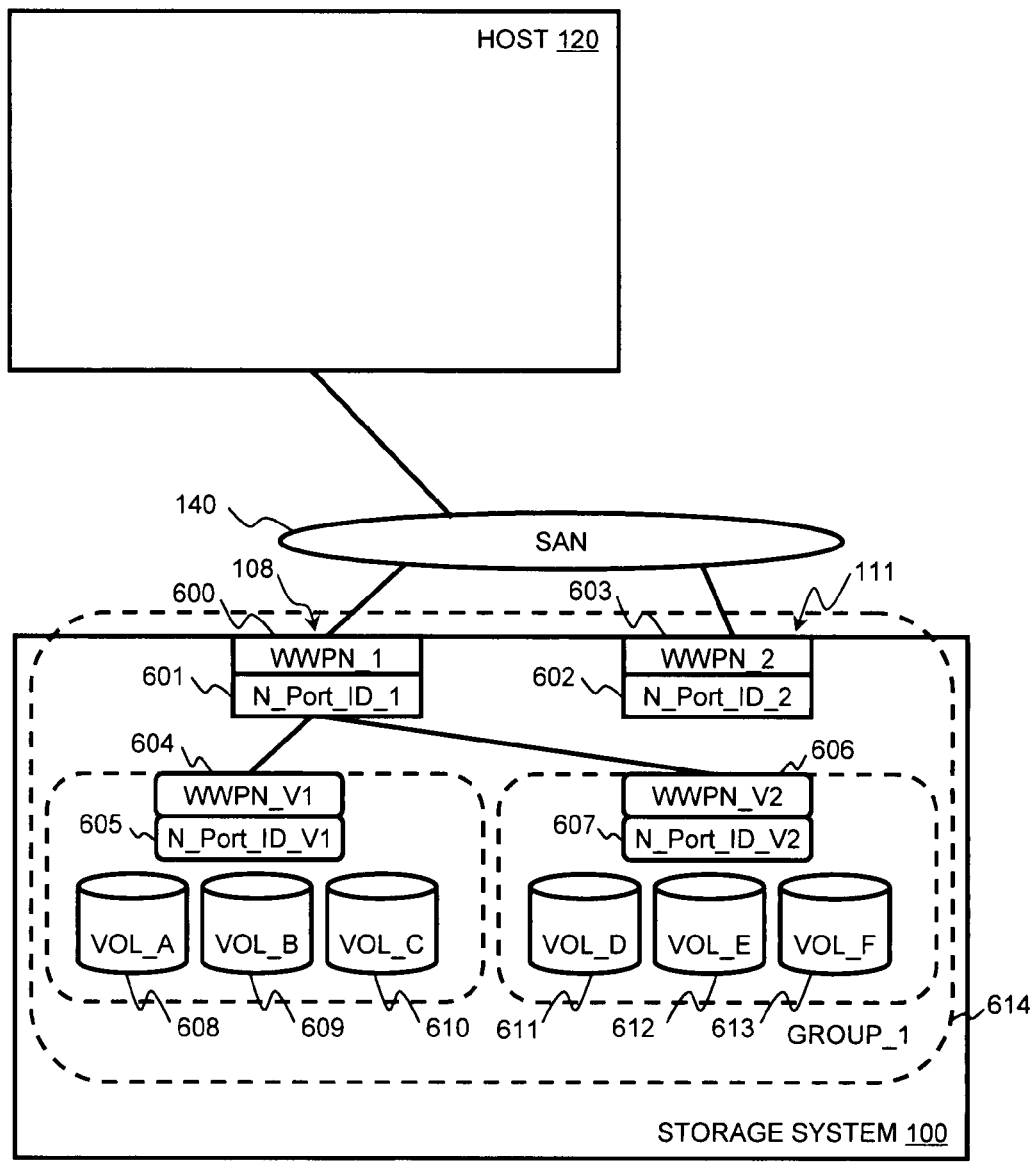
FIG. 6A Conceptual Diagram of 1st Embodiment Before Link Failure

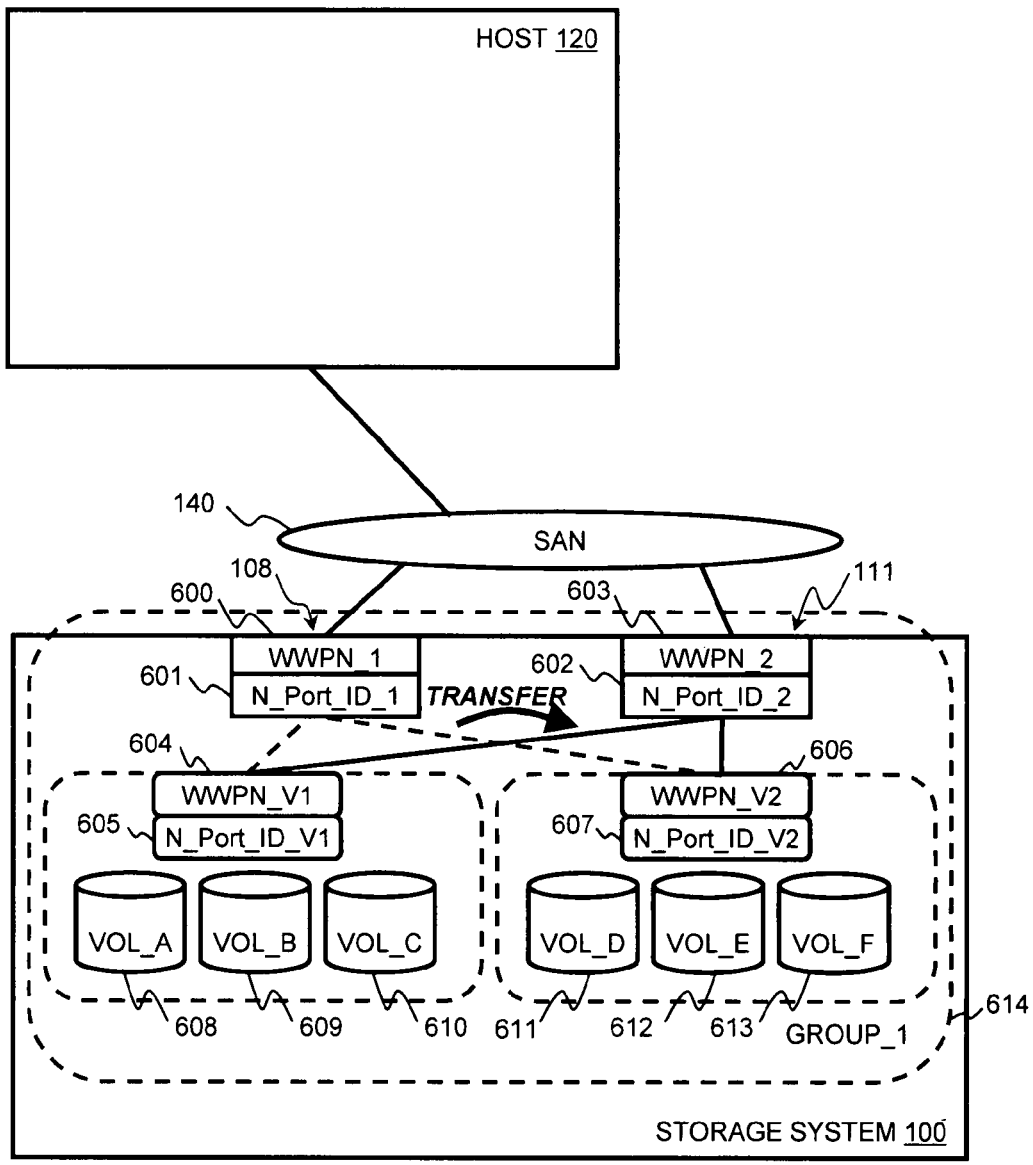
FIG. 6B Conceptual Diagram of 1st Embodiment after Link Failure and Port Reassignment

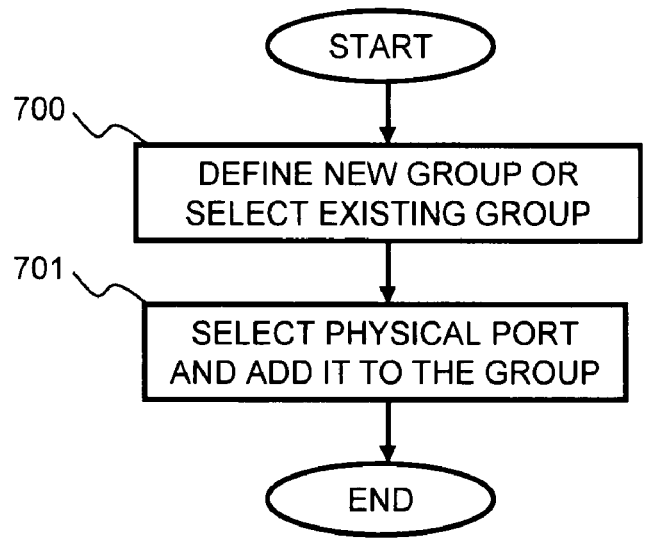
FIG. 7 Flowchart of Grouping Physical Port
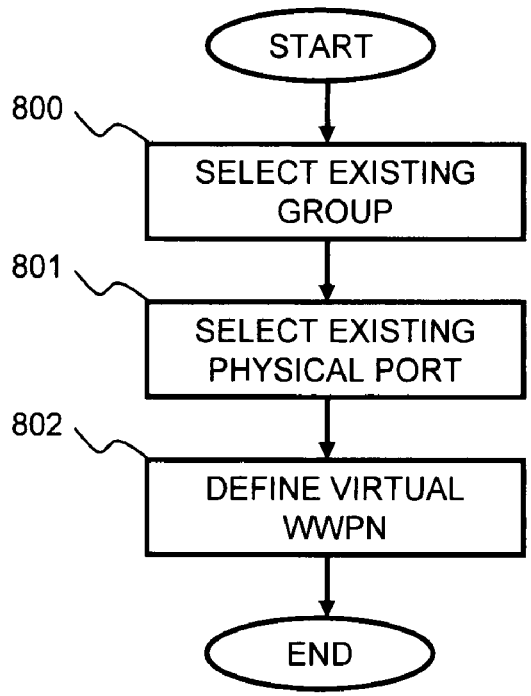
FIG. 8 Flowchart of Creating Virtual Port

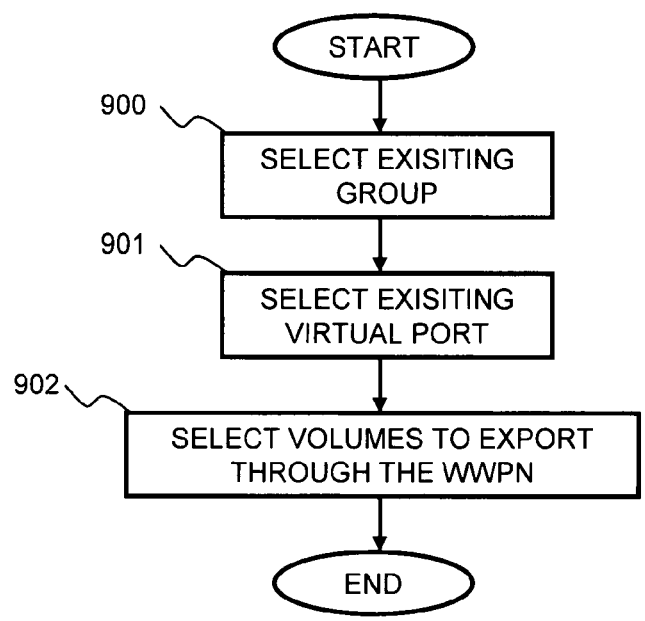
FIG. 9 Flowchart of Exporting Volumes Through Virtual Port

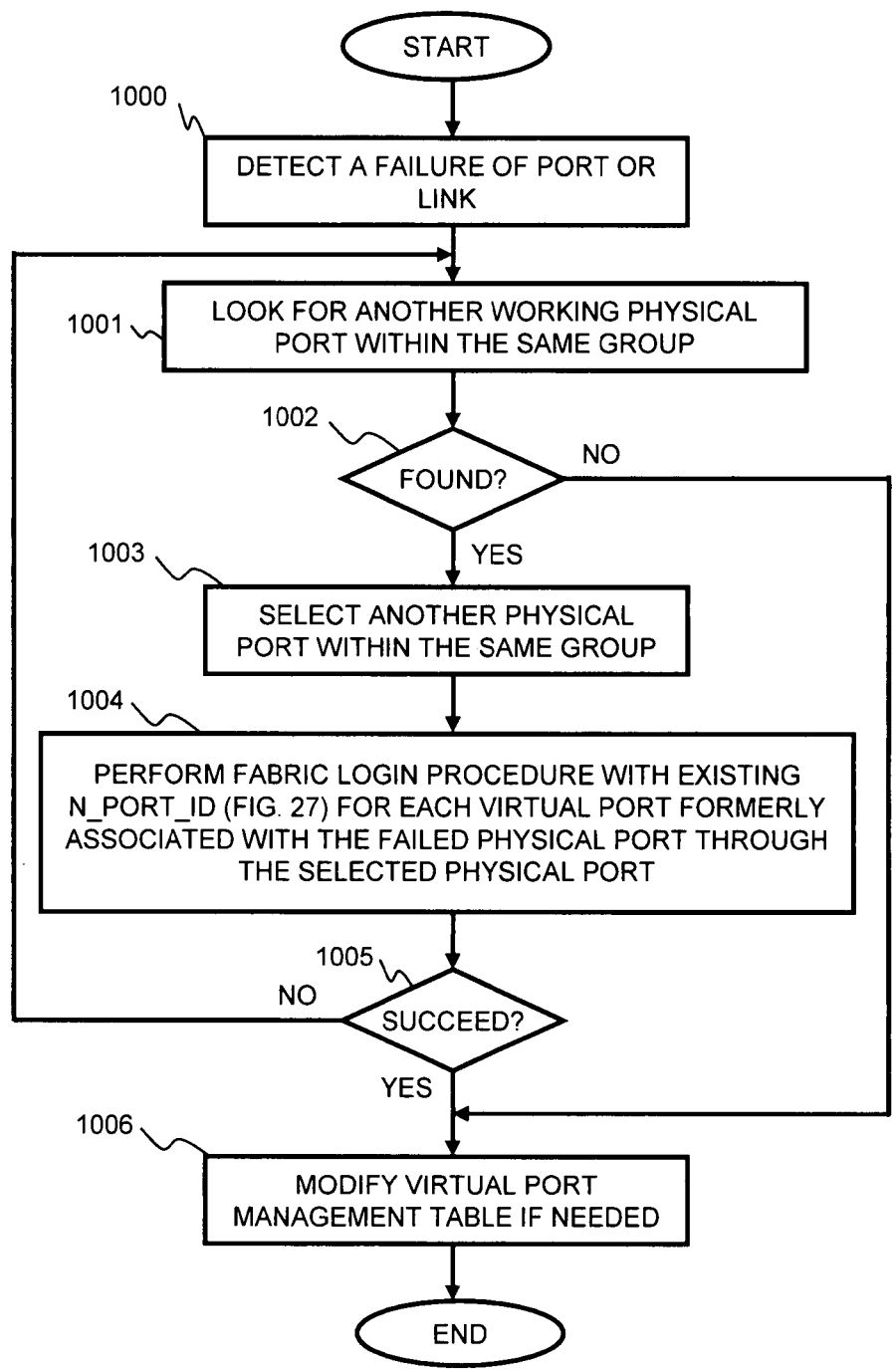
FIG. 10 Flowchart of Port Failover

| GROUP | PHYSICAL WWPN | STATUS | VIRTUAL WWPN | N_PORT_ID | EXPORTED VOLUME |
|---|---|---|---|---|---|
| GROUP_1 | 01234567 89ABCDP0 (WWPN_1) | LINK DOWN | NULL | FFFF00 (N_PORT_ID_1) | |
| | 01234567 89ABCDP1 (WWPN_2) | OK | NULL | FFFF03 (N_PORT_ID_2) | |
| | | | 01234567 89ABCDV0 (WWPN_V1) | FFFF01 (N_PORT_ID_V1) | VOL_A, VOL_B, VOL_C |
| | | | 01234567 89ABCDV1 (WWPN_V2) | FFFF02 (N_PORT_ID_V2) | VOL_D, VOL_E, VOL_F |
| ......... | ......... | ......... | ......... | ......... | ......... |

FIG. 11 Virtual Port Management Table

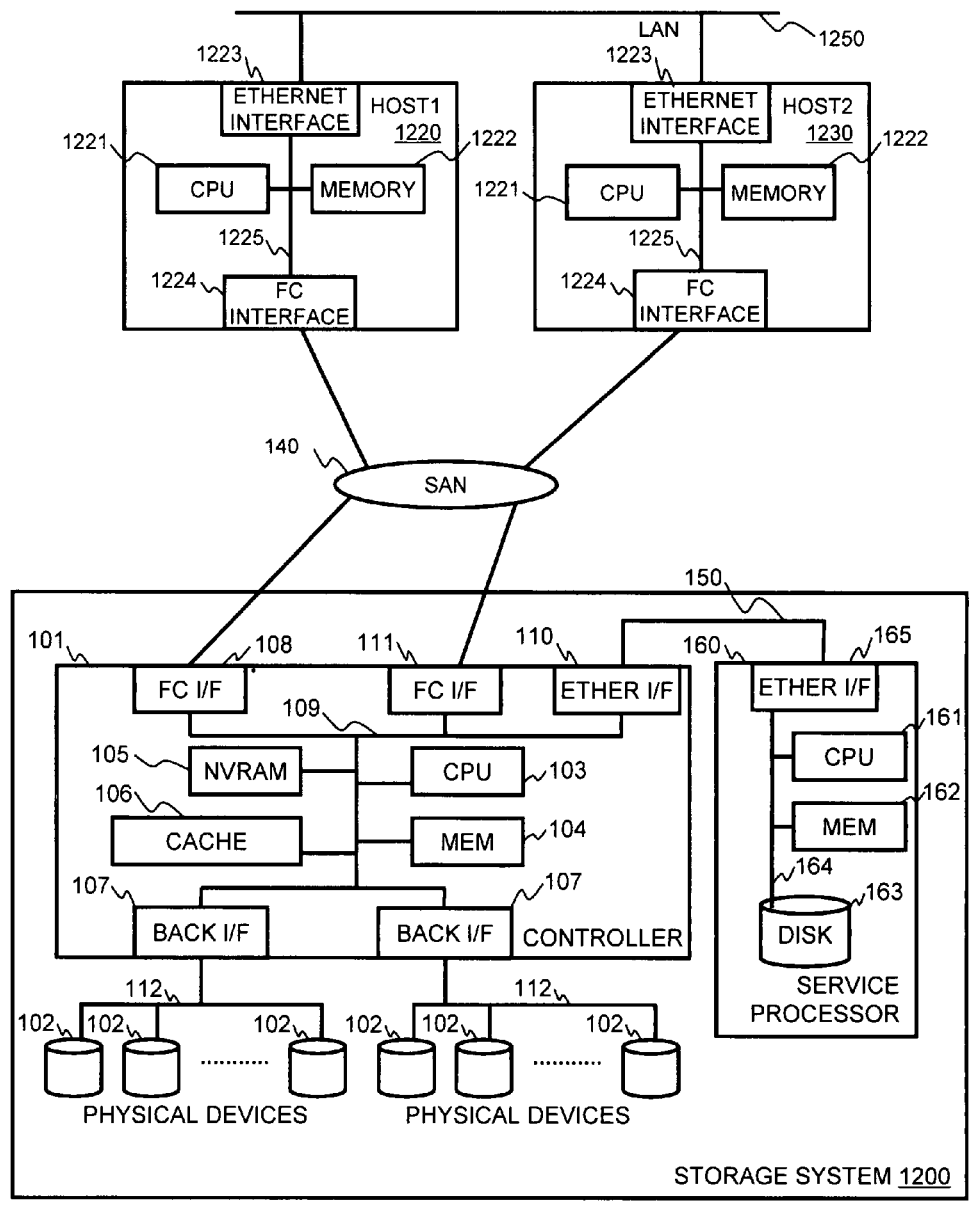
FIG. 12 System Configuration of 2nd embodiment

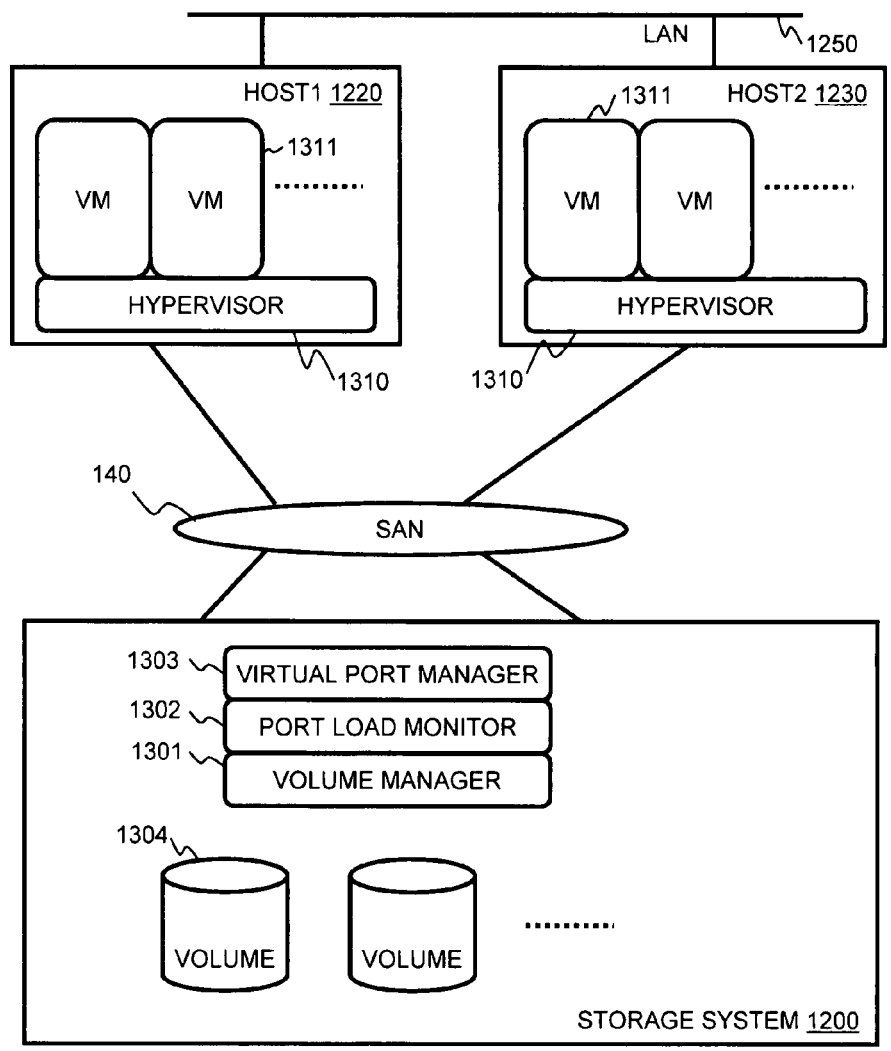
FIG. 13 Software Module Configuration of the 2nd Embodiment

| GROUP | PHYSICAL WWPN | LOAD |
|---|---|---|
| GROUP_1 | 01234567 89ABCDP0 (WWPN_1) | 10,000 IOPS |
| | 01234567 89ABCDP1 (WWPN_2) | 0 IOPS |
| | ⋮ | ⋮ |

FIG. 14 Physical Port Load Table

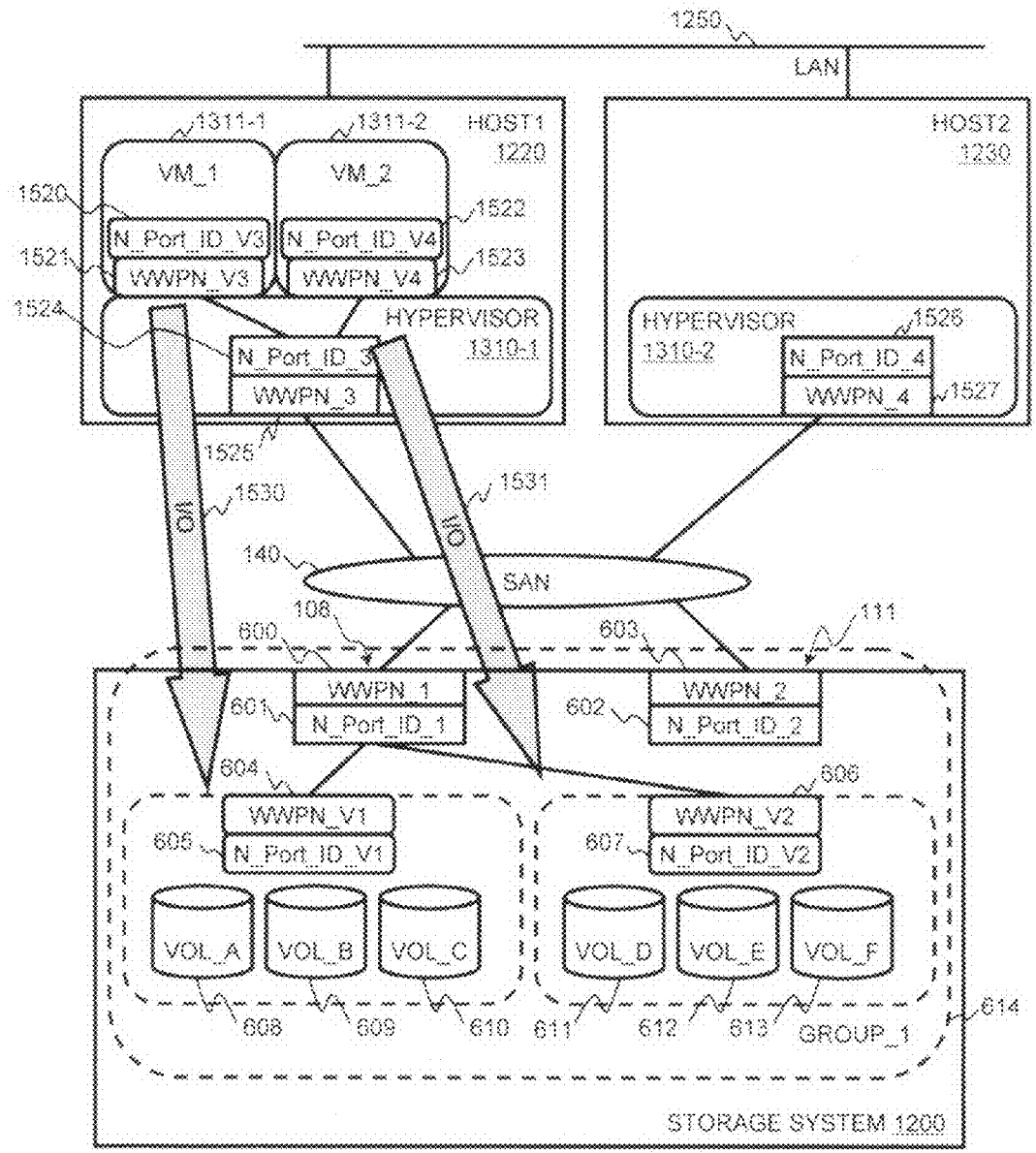
FIG.15 Conceptual Diagram of 2nd Embodiment Before Load Balancing

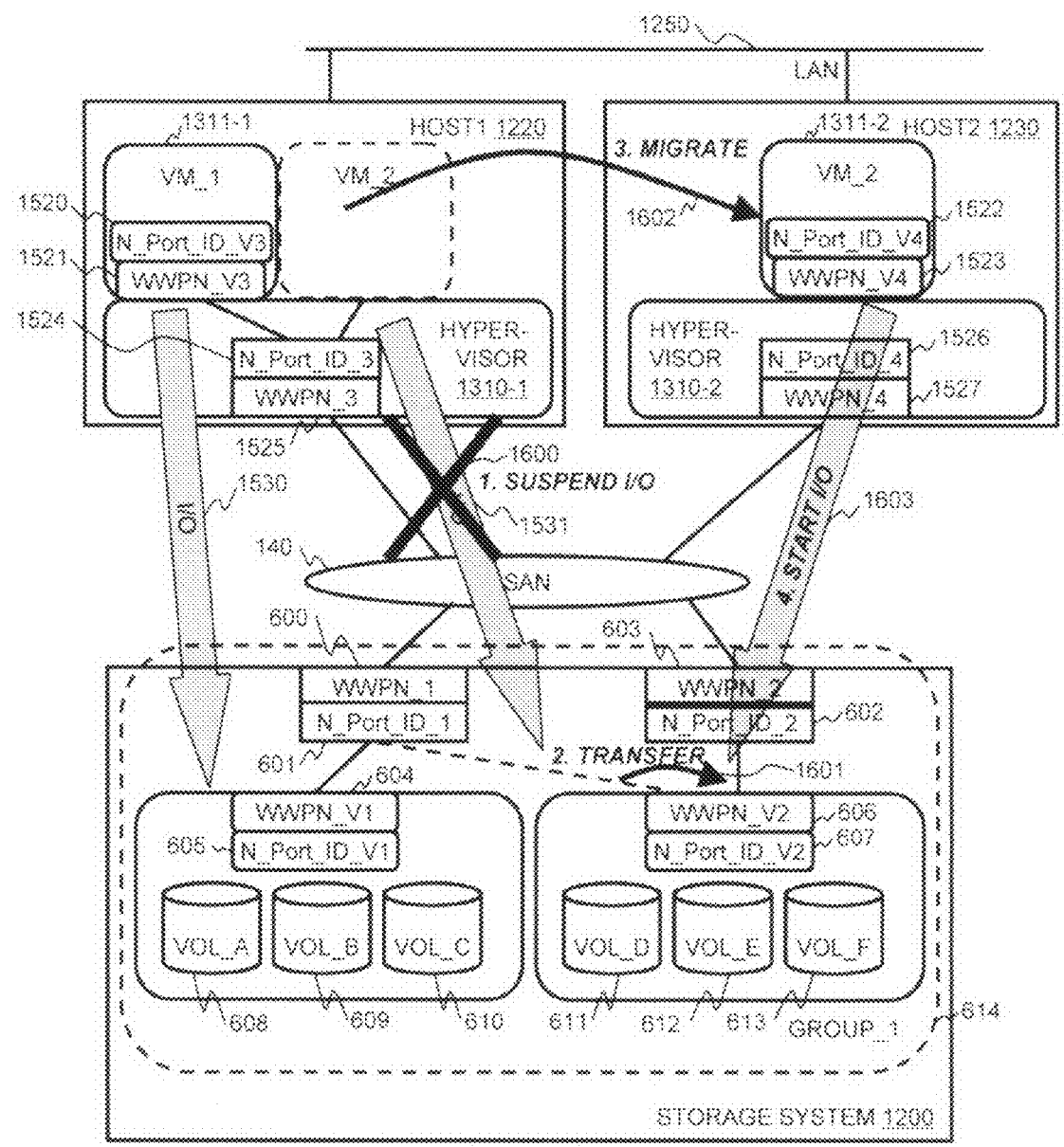
FIG.16 Conceptual Diagram of 2nd Embodiment After Load Balancing

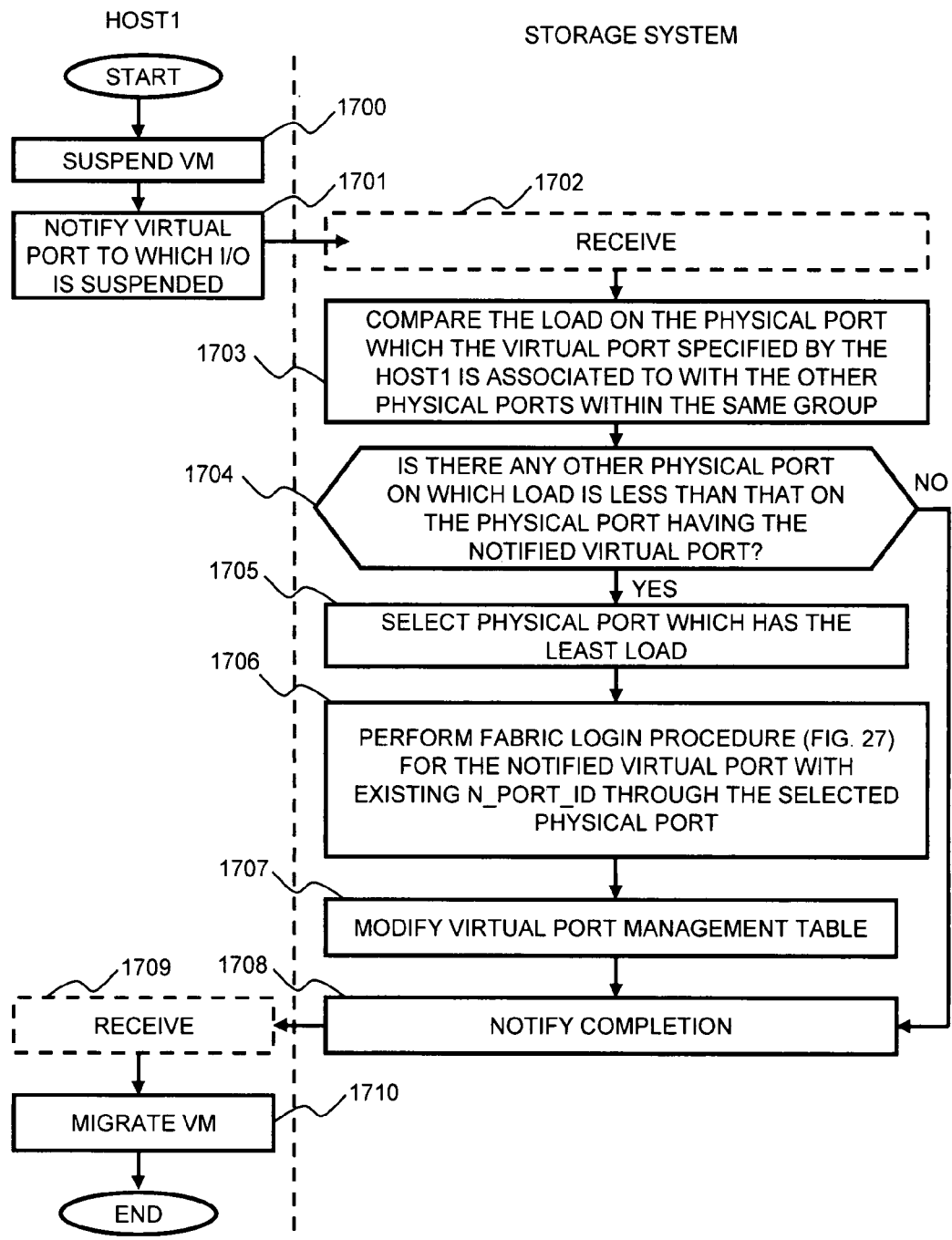
FIG. 17 Flowchart of Switching Port for Load Balancing

| GROUP | PHYSICAL WWPN | STATUS | VIRTUAL WWPN | N_PORT_ID | EXPORTED VOLUME |
|---|---|---|---|---|---|
| GROUP_1 | 01234567 89ABCDP0 (WWPN_1) | OK | NULL | FFFF00 (N_PORT_ID_1) | |
| | | | 01234567 89ABCDV0 (WWPN_V1) | FFFF01 (N_PORT_ID_V1) | VOL_A, VOL_B, VOL_C |
| | 01234567 89ABCDP1 (WWPN_2) | OK | NULL | FFFF03 (N_PORT_ID_2) | |
| | | | 01234567 89ABCDV1 (WWPN_V2) | FFFF02 (N_PORT_ID_V2) | VOL_D, VOL_E, VOL_F |
| ......... | ......... | ......... | ......... | ......... | ......... |

FIG. 18 Virtual Port Management Table After Load Balancing

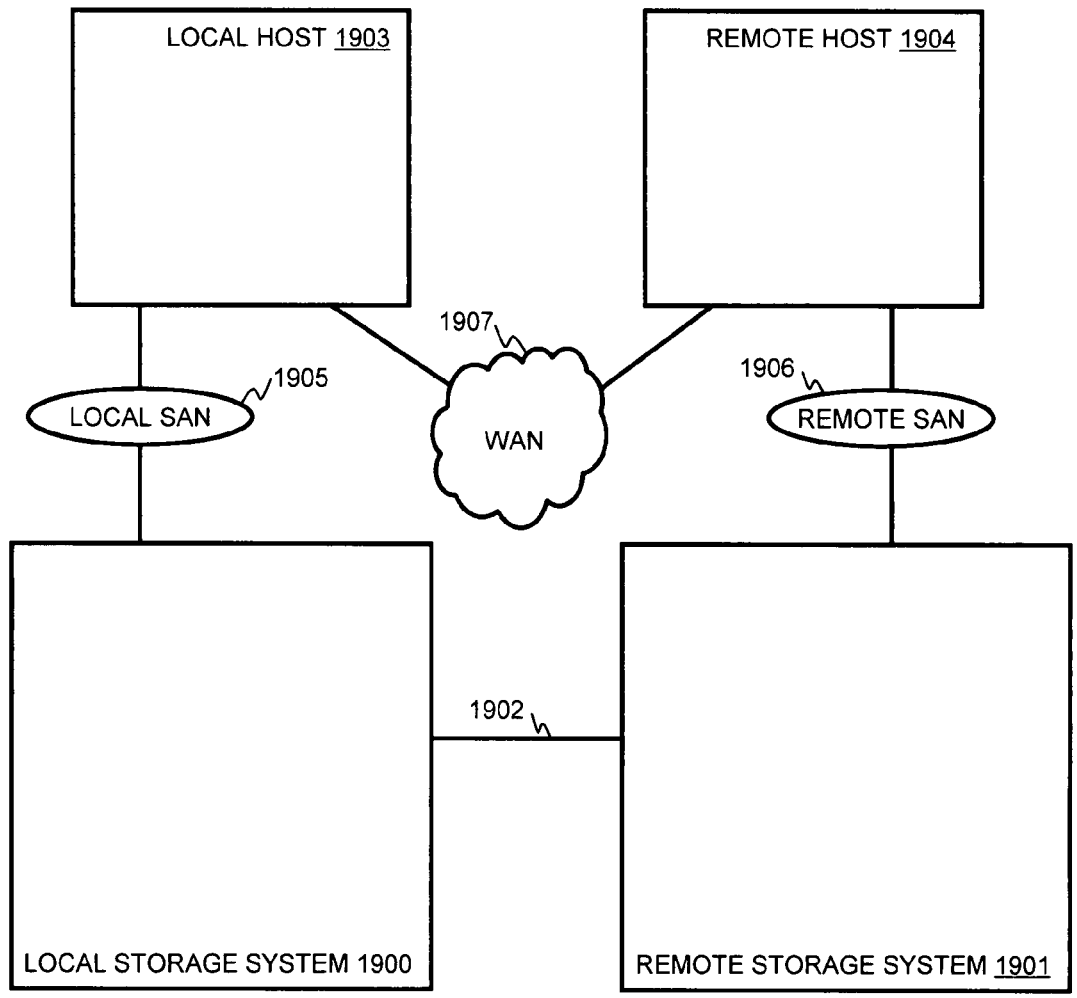
FIG. 19 System Configuration of the 3rd embodiment

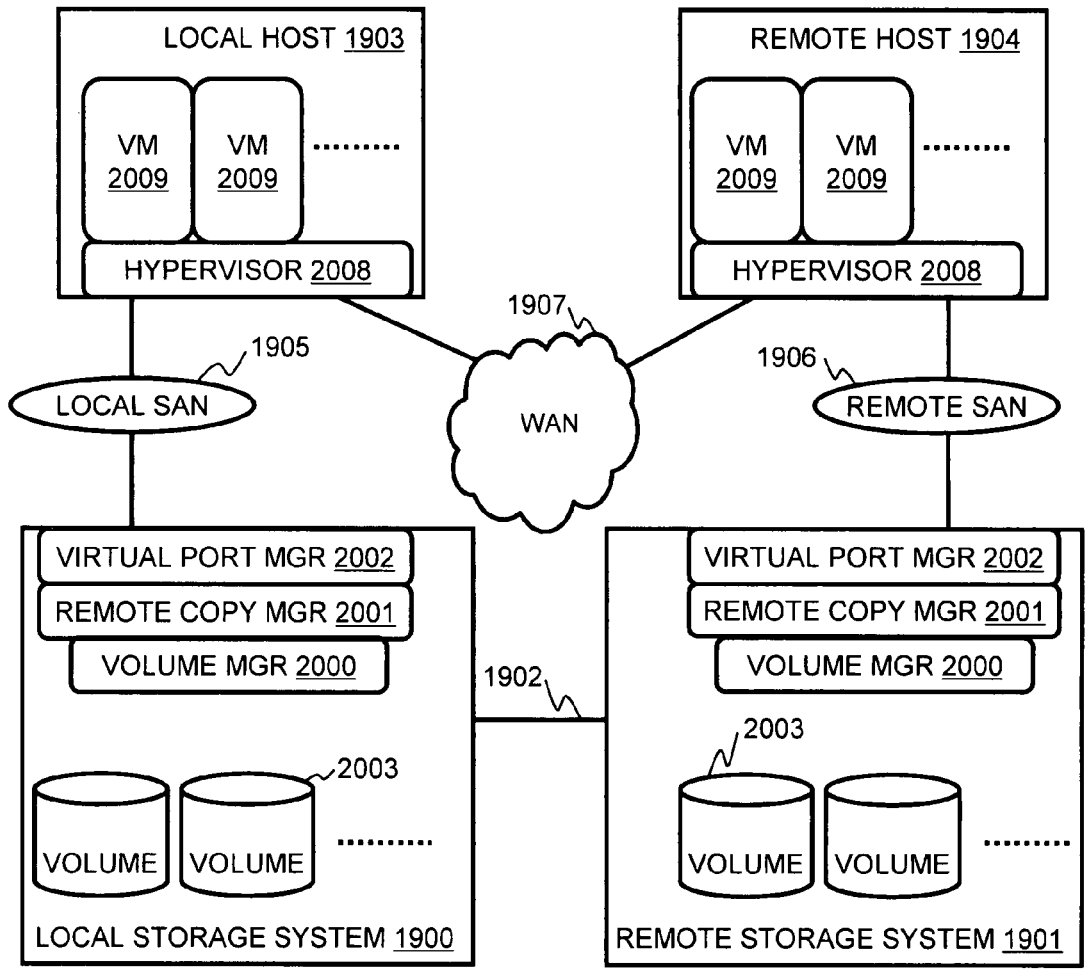
FIG. 20 Software Module Configuration of 3rd Embodiment

| GROUP 2101 | ACTIVE VOLUME 2107 | VIRTUAL WWPN 2102 | LOCAL PHYSICAL WWPN 2103 | REMOTE PHYSICAL WWPN 2104 | LOCAL VOLUME 2105 | REMOTE VOLUME 2106 |
|---|---|---|---|---|---|---|
| GROUP_1 | LOCAL | 01234567 89ABCDV0 (WWPN_V1) | 01234567 89ABCDE0 (WWPN_1) | 01234567 89ABCDF0 (WWPN_2) | VOL_A | VOL_D |
|  |  |  |  |  | VOL_B | VOL_E |
| GROUP_2 | LOCAL | 01234567 89ABCDV1 (WWPN_V2) | 01234567 89ABCDE1 (WWPN_1) | 01234567 89ABCDF1 (WWPN_2) | VOL_C | VOL_F |
| ............ | ............ | ............ | ............ | ............ | ............ | ............ |

FIG. 21 Remote Copy Management Table

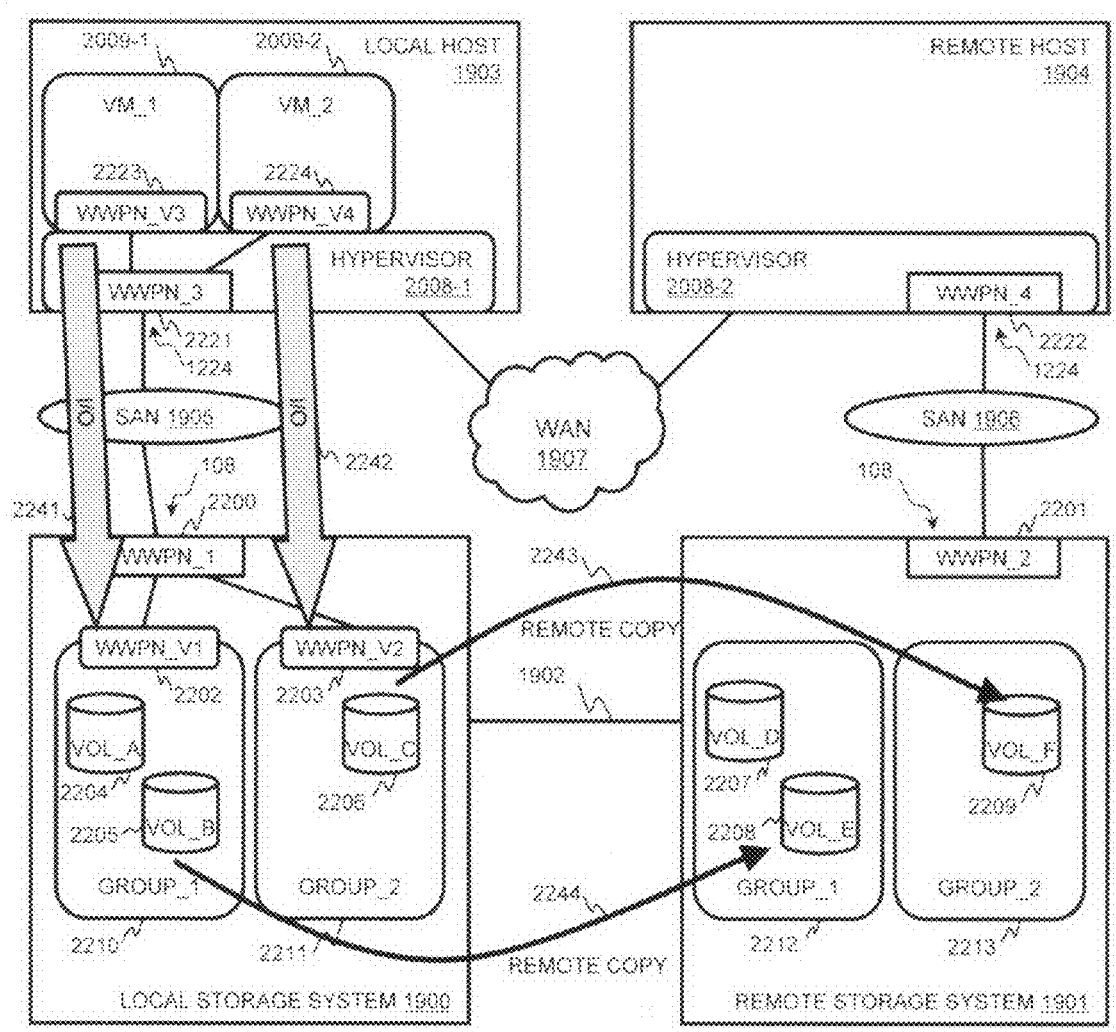
FIG. 22 Conceptual Diagram of 3rd Embodiment

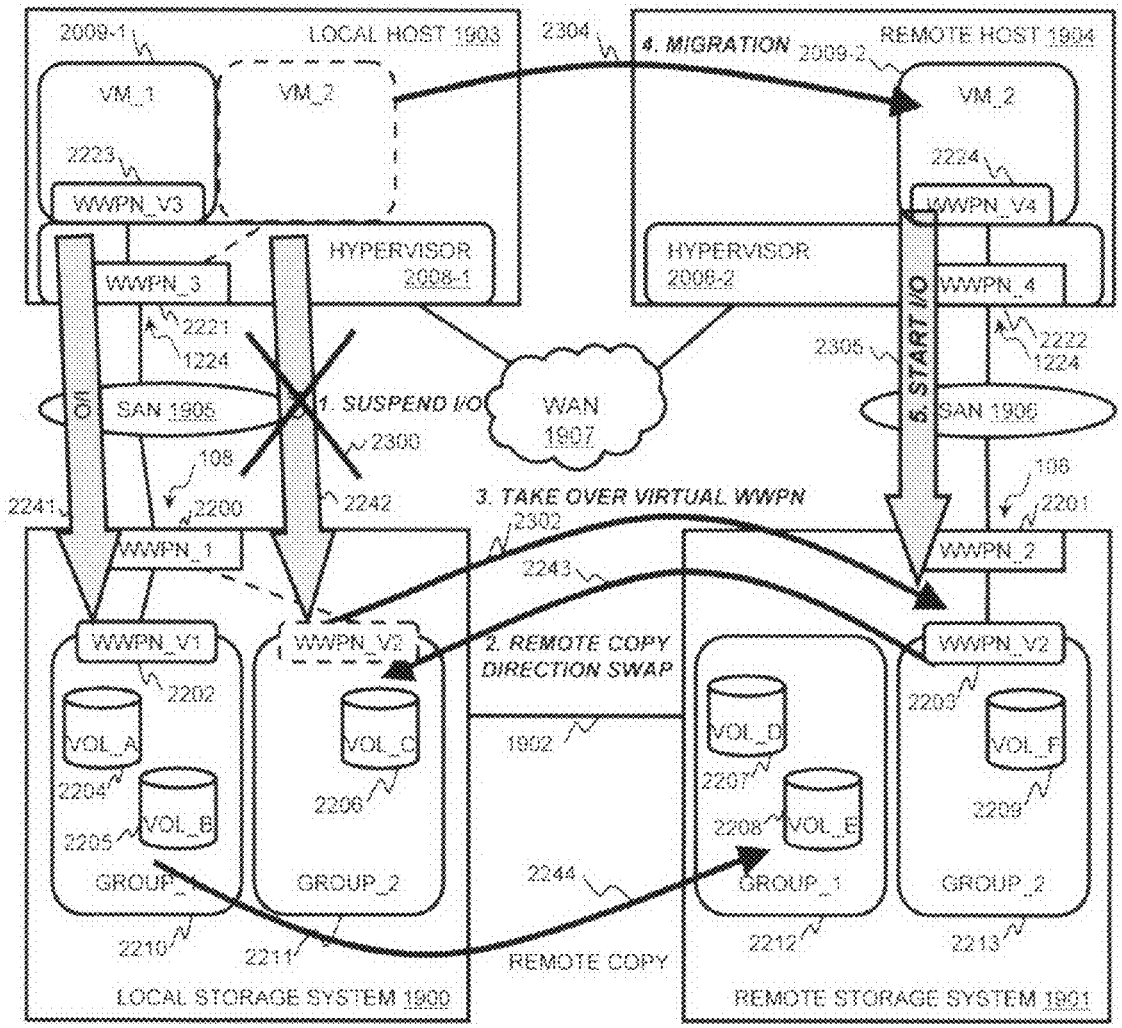
FIG. 23 Conceptual Diagram of 3rd Embodiment

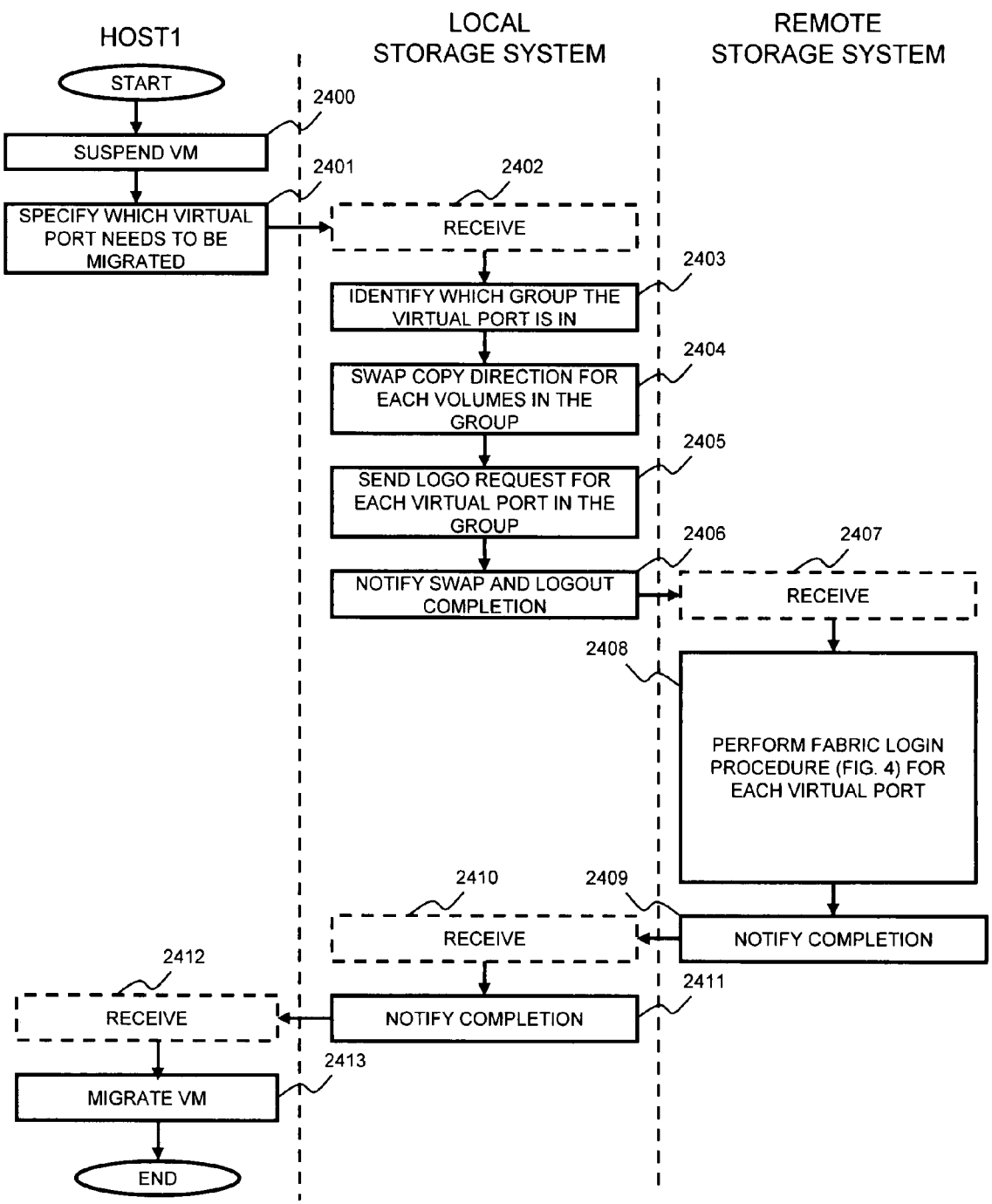
FIG. 24 Flowchart of Taking Over Virtual Port to Remote Storage System

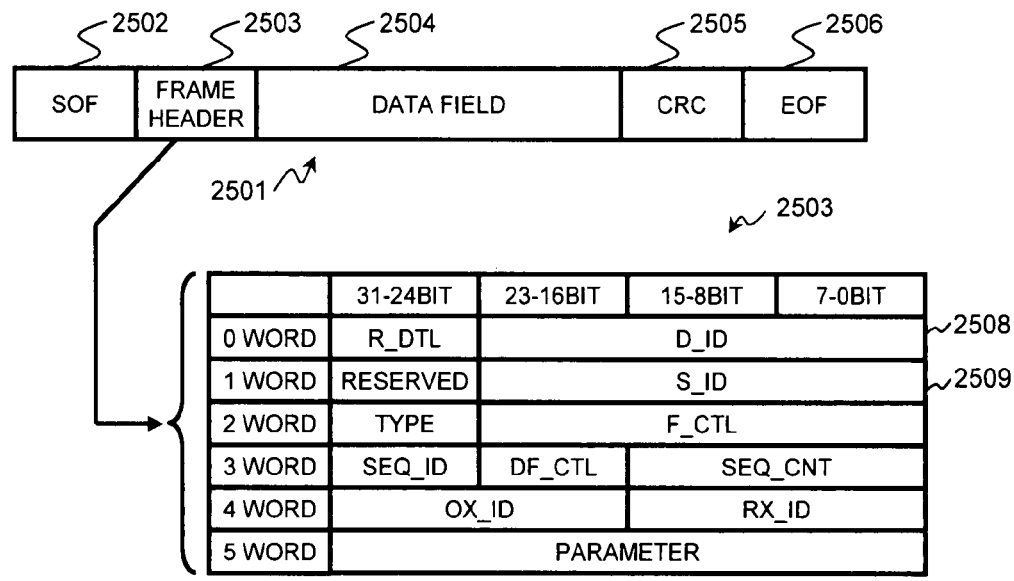
FIG. 25 Frame and Frame Header (Related Art)
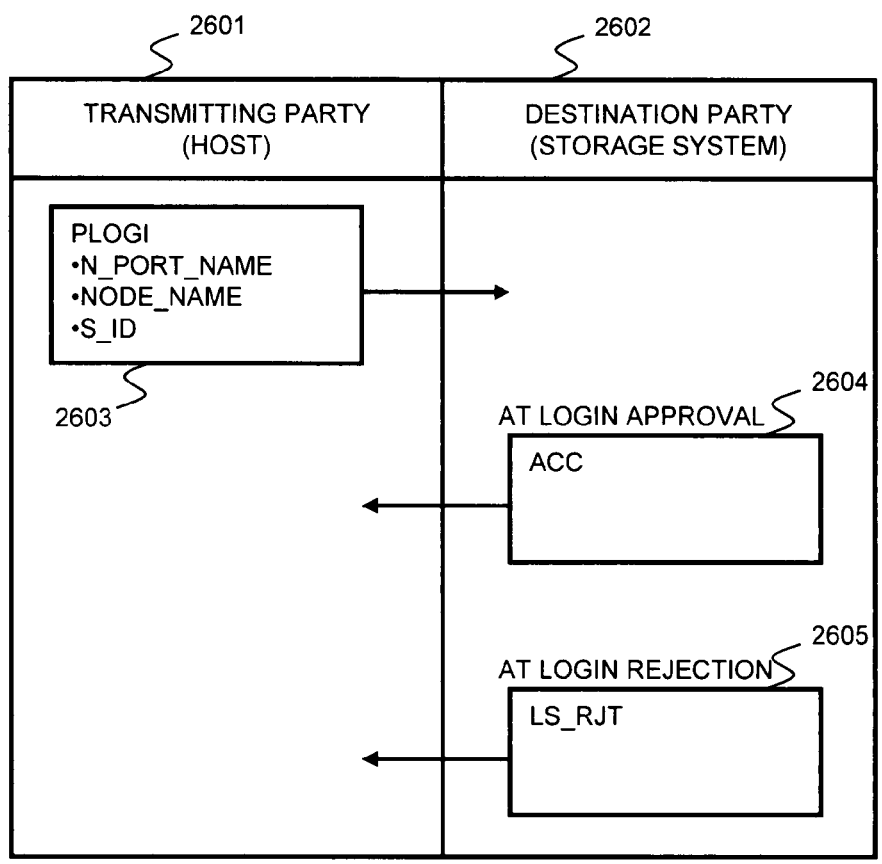
FIG. 26 Node Login Procedure (Related Art)

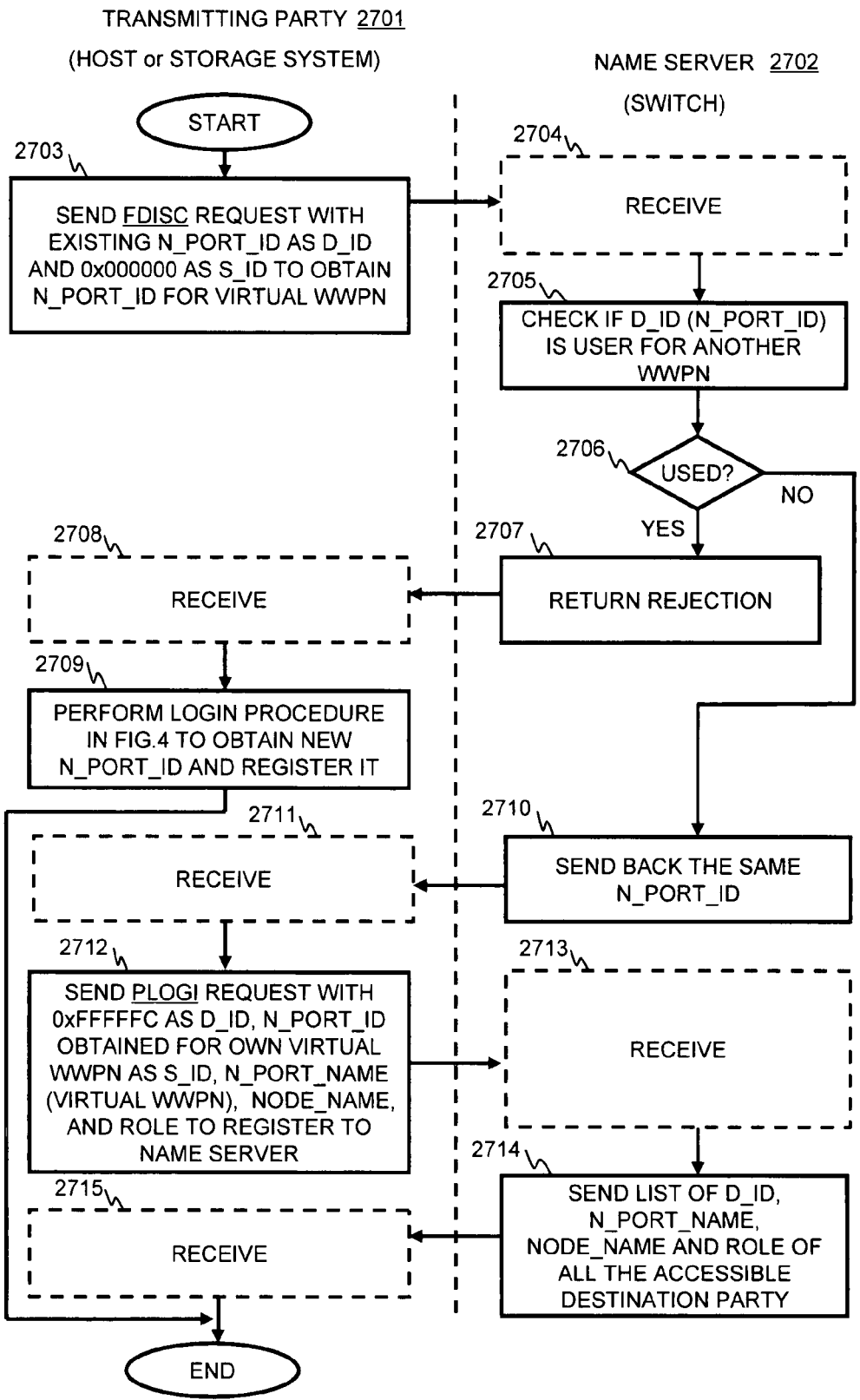
FIG. 27 Fabric Login Procedure for Virtual Port with Existing N_Port_ID

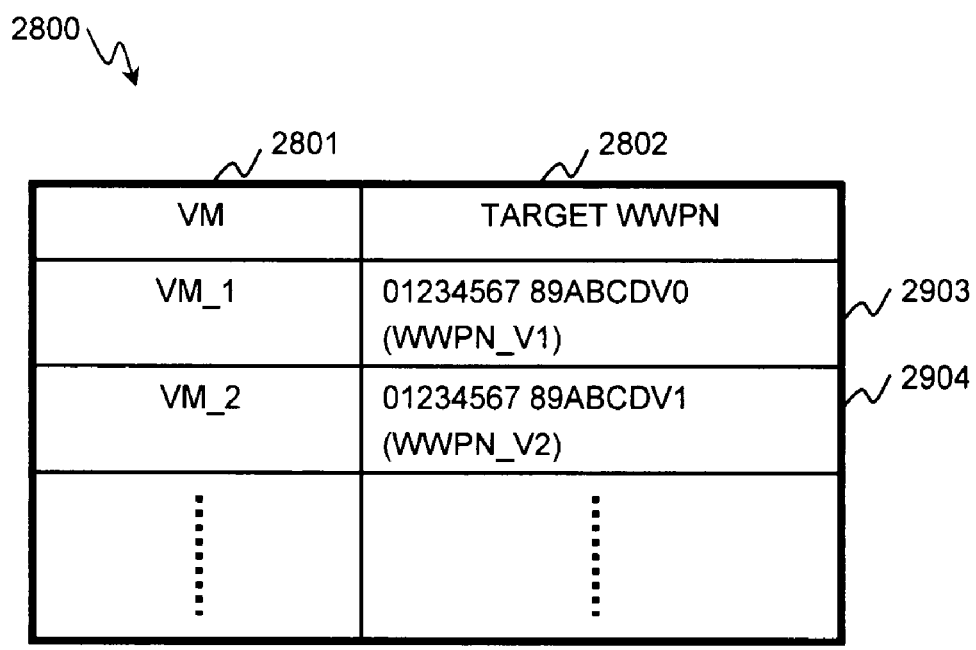
FIG. 28 VM-WWPN Mapping Table

METHOD AND APPARATUS FOR MANAGING VIRTUAL PORTS ON STORAGE SYSTEMS

BACKGROUND OF THE INVENTION

1. Field of the Invention

The present invention relates generally to storage systems that store data.

2. Description of Related Art

Recently, the amount of power consumed by servers in some data centers is becoming a significant issue. One possible solution for this problem is server consolidation using virtual machine software. Virtual machine software is able to provide multiple virtual server environments (i.e., virtual machines or VMs) on a single server hardware (or a physical server), and thereby enable the physical single server to run multiple operating systems (OSs). What is more, virtual machines that are in operation on virtual machine software are able to be migrated to another physical server for the purpose of load balancing between physical servers, clustering in preparation for server hardware failure, and for other purposes. However, when a virtual machine is migrated from a current physical server (i.e., a source server) to another physical server (i.e., a destination server), the volumes being accessed by the virtual machine still need to be accessible from the destination server after the virtual machine has been migrated. Therefore, any volumes used by the virtual machines need to be able to be shared between the source server and the destination server, which limits flexibility of connection among physical servers and storage systems, and increases security risks.

In separate developments, multipath I/O (input/output) is a technology by which multiple paths are provided to a mass storage device in order to provide redundancy in case of failure of one of the components in one of the paths. Thus, multiple paths may be provided in an information system, such as by providing multiple ports, switches, or the like. For example, multipathing technology can enable servers to keep running in case of failure of Fibre Channel (FC) ports on a storage system or failure of links connected to the ports. Multipathing technology enables the deployment of redundant FC links between servers and storages, and the servers are able to keep running transparently without any disruption in case of the failure of a port on the storage system or links connected to the port. However, to utilize conventional multipathing technology, specialized software is required to be installed on the servers, and conventional multipathing solutions do not address the use of or failover of virtual ports.

Furthermore, disaster recovery is now a significant requirement for protecting information systems against large-scale disasters. Typically, disaster recovery is achieved by copying data from a local storage to another storage system in a remote location, often accompanied by clustering servers over networks. Although virtual machine software typically has a function to facilitate migration of a virtual machine to another server upon a failure at the first server (server clustering), virtual machine software does not meet requirements for disaster recovery because the storages still need to be shared among the servers, and the virtual machine needs to be able to access the storage volumes that it was using prior to migration, as mentioned above.

Related art includes U.S. Pat. No. 6,779,083 B2, to Ito et al., entitled "Security for Logical Unit in Storage Subsystem", the disclosure of which is incorporated herein by reference.

BRIEF SUMMARY OF THE INVENTION

The invention provides methods and apparatuses for managing virtual ports on storage systems so that the storage systems can ensure redundancy of paths between servers and storage systems without installing special software on the servers. The invention also provides load balancing between physical ports on storage systems, and enables remote migration of virtual machines by utilizing and transferring virtual ports. These and other features and advantages of the present invention will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

FIG. 1 illustrates an example of a system hardware architecture of a first embodiment of the invention.

FIG. 2 illustrates an exemplary software module configuration of the embodiment of FIG. 1.

FIG. 3 illustrates an exemplary fabric login procedure for a physical port.

FIG. 4 illustrates an exemplary fabric login procedure for a virtual port.

FIG. 5 illustrates an exemplary data structure of a virtual port management table.

FIGS. 6A-6B illustrate exemplary conceptual diagrams of the first embodiment.

FIG. 7 illustrates an exemplary process for grouping physical ports.

FIG. 8 illustrates an exemplary process for creating virtual ports.

FIG. 9 illustrates an exemplary process for exporting volumes through virtual ports.

FIG. 10 illustrates an exemplary process for port failover.

FIG. 11 illustrates an exemplary data structure of a virtual port management table.

FIG. 12 illustrates example of a system hardware architecture of a second embodiment of the invention.

FIG. 13 illustrates an exemplary software module configuration of the embodiment of FIG. 12.

FIG. 14 illustrates an exemplary data structure of a physical port load table.

FIG. 15 illustrates an exemplary conceptual diagram of the second embodiment before migration.

FIG. 16 illustrates an exemplary conceptual diagram of the second embodiment after migration.

FIG. 17 illustrates an exemplary process for switching port loads for load balancing.

FIG. 18 illustrates an exemplary data structure of a virtual port management table after load balancing.

FIG. 19 illustrates an example of a system hardware architecture of a third embodiment of the invention.

FIG. 20 illustrates an exemplary software module configuration of the embodiment of FIG. 19.

FIG. 21 illustrates an exemplary data structure of a remote copy management table.

FIG. 22 illustrates an exemplary conceptual diagram of the third embodiment before migration.

FIG. 23 illustrates an exemplary conceptual diagram of the third embodiment after migration.

FIG. 24 illustrates an exemplary process flow for taking over a virtual port to a remote storage system.

FIG. 25 illustrates an exemplary data structure of a frame header.

FIG. 26 illustrates an exemplary node login procedure.

FIG. 27 illustrates an exemplary process flow for a fabric login procedure for a virtual port with an existing N_Port_ID.

FIG. 28 illustrates an exemplary data structure of a VM-WWPN mapping table.

DETAILED DESCRIPTION OF THE INVENTION

In the following detailed description of the invention, reference is made to the accompanying drawings which form a part of the disclosure, and, in which are shown by way of illustration, and not of limitation, specific embodiments by which the invention may be practiced. In the drawings, like numerals describe substantially similar components throughout the several views. Further, the drawings, the foregoing discussion, and following description are exemplary and explanatory only, and are not intended to limit the scope of the invention or this application in any manner.

The storage system according this invention has a function to create and manage virtual ports for solving the problems discussed above with respect to port failover, load balancing between ports, and migration of virtual machines. When the storage system detects failure of physical ports or links connected to the physical ports, the storage system changes association between physical ports and virtual ports so that hosts can continue accessing data through the virtual ports via other physical ports. Also, the storage system is configured to monitor a load on each physical port, and the storage system can change the association between virtual ports and physical ports so that the load on the physical ports is more balanced. Also, in a remote copy environment, when a remote storage system takes over volumes from a local storage system, the remote storage system is also configured to take over any virtual port addresses associated with the volumes so that virtual machine software can migrate one or more virtual machines in the remote copy environment to a remote host computer.

First Embodiment—System Configuration

FIG. 1 illustrates an example of a hardware architecture of the information system of the first embodiment of the invention. In the information system illustrated in FIG. 1, a storage system 100 is connected for communication with one or more host computers 120 via a network 140, such as a Fibre Channel (FC) SAN (Storage Area Network). Storage system 100 includes a storage controller 101 in communication with one or more physical storage devices 102. Controller 101 includes a CPU 103, a memory 104, a NVRAM (non-volatile random access memory) 105, a cache memory 106, one or more backend interfaces 107, a plurality of front end interfaces 108, 111, and at least one Ethernet or LAN (local area network) interface 110. These components are connected to each other via an internal bus 109, or the like. When network 140 is an FC SAN, front end interfaces 108, 111 are FC interfaces, such as physical ports, each having its own physical WWN (World Wide Name). Controller 101 is able to communicate with hosts 120 through the FC interfaces 108, 111 via SAN 140, and to the storage devices 102 through backend interfaces 107. Some of the programs realizing this invention, as discussed below, run on controller 101 using CPU 103 and memory 104. However, it should be noted that the software of the invention may be tangibly embodied in other computer readable mediums.

Storage devices 102 are hard disk drives in the preferred embodiment. However, other data storage media such as optical disks, solid state memory, or the like, can be used as storage devices 102. Storage devices 102 are connected to the controller 101 via a direct connection or one or more back end networks 112.

Service processor 160 may also be included with storage system 100. Service processor 160 typically includes a CPU 161, a memory 162, a hard disk drive 163, and an Ethernet or LAN interface 165. These components are connected each other via an internal bus 164. Interface 165 connects service processor 160 is connected to interface 110 on controller 101 via an internal network or LAN 150.

At least one host 120 is connected in the information system of the first embodiment. Host 120 comprises at least a CPU 121, a memory 122, and a network interface 124, such as a host bus adapter or other FC interface when network 140 is an FC SAN. These components are connected to each other via an internal bus 125. Host 120 is able to connect to storage system 100 through FC interface 124 via network 140. Network 140 is composed of switches and cables so as to be able to establish communication conforming to an FC-SW (Fibre Channel Switched Fabric) standard between host 120 and storage system 100. In the other embodiments, the network 140 may use a different technology, such as Ethernet (IP-SAN), or the like.

Software Modules

As illustrated in FIG. 2, there are two kinds of software modules retained in memory 104 which are executed by CPU 103 in controller 101 of storage system 100. A logical device or volume manager 202 creates one or more logical volumes 203 using the available capacity of the storage devices 102 in storage system 100. Volume manager 202 also manages the mapping between the logical volumes 203 and the physical storage devices 102.

A virtual port manager 201 creates one or more virtual ports for the front end network physical ports (FC interfaces 108, 111) in accordance with instructions from an administrator of storage system 100. Also, virtual port manager 201 monitors a status of the physical ports 108, 111, and communication links connected to the ports 108, 111, and changes correlations between physical ports 108, 111 and virtual ports, if needed. Virtual port manager 201 manages the information of ports and status using a virtual port management table 500, as discussed further below. The software modules may be tangibly embodied in memory 104, storage devices 102 or other computer readable medium.

Fibre Channel Protocol

Fibre Channel is set forth in these embodiments as an example of a network interface type used between host 120 and storage system 100. A device having an interface in a Fibre Channel network is referred to as a "node", and a physical terminal corresponding to an actual interface is referred to as a "port". A node in an FC network can have one or more ports. The number of ports that can simultaneously participate in the overall system of the Fibre Channel is limited by the number of bits in the address field, which is a maximum of 24 bits, thereby enabling a total of $2^{24}$ (16,777,216) possible ports in any one FC network. Hardware that mediates these connections is referred to a "fabric". In practice, transmitting ports and destination ports need only operate by taking information related to the mutual ports into account, and without the necessity of taking the fabric into account.

Each of the nodes and ports stores WWN identification data that is unique worldwide, and that is allocated by IEEE (Institute of Electrical and Electronics Engineers) in accordance with predetermined rules. The WWN identifier in a FC network is used in a manner similar to MAC addresses in an Ethernet network, and are fixed identifying addresses designated for a piece of hardware. The WWN addresses include two kinds: (1) port WWN and (2) node WWN, i.e., N_Port_Name and Node_Name, respectively, each having an eightbyte size. N_Port_Name is a value (hardware address) unique to each port, and Node_Name is a value (hardware address) unique to each node. Since these identifier values are unique worldwide, they are capable of primarily identifying the ports and nodes in an FC network. In examples of the invention set forth below, the term "WWPN" represents N_Port_Name (i.e., Worldwide Port Name or port WWN).

Also, as described below, Fibre Channel standards allow a port to assign additional WWPNs on it dynamically. This feature is known as "N_Port ID Virtualization" or "NPIV". The additional WWPNs are typically determined on each device automatically so that they will be unique worldwide. To clarify between WWPNs as hardware addresses and WWPNs as additional port addresses created dynamically, the terms "physical WWPN" and "physical port" are used for a WWPN as a hardware address, and the terms "virtual WWPN" and "virtual port" are used for a WWPN as additional address assigned dynamically on a physical port.

Under the Fibre Channel standards, communication is executed by information on a signal level referred to as an "Ordered Set" and by logical information having a fixed format referred to as a "frame". FIG. 25 illustrates a typical structure of a frame 2501. Frame 2501 has a 4-byte identification data that represents the start of the frame and called "SOF" (Start Of Frame) 2502, a 24-byte frame header 2503 characterizes control of a link operation and the frame. Frame 2501 also includes a data field 2504 which is the data (i.e., data content) that is transferred by the frame 2501, a 4-byte cyclic redundancy code (CRC) 2505, and a 4-byte identification data called "EOF" (End of Frame) 2506 which represents notification of the end of the frame. The data field 2504 is variable between 0 to 2,112 bytes.

Next, the content of the frame header 2503 will be explained. Frame header 2503 includes a D_ID 2508 and a S_ID 2509, which correspond to 0 to 23 bit areas of the first and second word in the frame header 2503. D_ID (Destination ID) 2508 and S_ID (Source ID) 2509 are 3-byte address identification data for identifying the port receiving the frame and the port transmitting the frame, respectively, and have values effective for all the frames to be transmitted and received. FC-PH (Fibre Channel Physical and signaling interface) which is one of the FC standards, stipulates that the fabric allocates D_ID 2508 and S_ID 2509 during the initialization procedure. The allocated value depends on N_Port_Name (WWPN) or Node_Name at each port.

Fabric Login Procedure for Physical Port

The login procedure of equipment of the transmitting party and the name server for mutually exchanging information on the basis of the Fibre Channel protocol for physical ports is next described. FIG. 3 illustrates the exchange of information between a transmitting party 301 (login requesting party, corresponding to either of host 120 and storage system 100 in this invention) and a name server 302 (corresponding to switches within SAN 140 in this invention). Typically, this login procedure is carried out when physical ports are first connected to the fabric. The following explanation is a procedure given for a login of FC, Class 3, although several kinds of login procedures for Fibre Channel are available.

Step 303: The transmitting party 301 transmits a FLOGI frame containing predetermined D_ID (0xFFFFFE), predetermined S_ID (0x000000), and N_Port_Name (physical WWPN) and Node_Name of the transmitting party.

Steps 304-305: The name server 302 receives the frame and determines the N_Port_ID for the physical WWPN of transmitting party 301 based on FC_PH.

Step 306: Name server 302 sends back the determined N_Port_ID to the transmitting party 301.

Steps 307-308: After receiving the N_Port_ID, the transmitting party 301 regards the N_Port_ID as its own N_Port_ID, and transmits a PLOGI frame with its own N_Port_ID as S_ID, N_Port_Name (physical WWPN) and Node_Name to the name server 302.

Steps 309-310: The name server receives the second frame, and the name server 302 sends back a list of D_IDs, N_Port_Names (both physical and virtual WWPNs) and Node_Names of all the accessible destination parties in the network (corresponding to physical and virtual WWPNs on host 120 and storage system 100 in this invention).

Step 311: The transmitting party 301 receives this list and maintains the list showing the correspondence of D_ID and N_Port_Name (physical and virtual WWPNs) for each destination party.

N_Port ID Virtualization and Fabric Login Procedure for Virtual Port

As part of the Fibre Channel protocol (for example, Fibre Channel Device Attach 2, FC-DA2), N_Port ID Virtualization (NPIV) is defined. This feature allows a physical port to have multiple virtual ports created to function through it. The virtual WWPN for each virtual port is determined on each physical port, and an additional login procedure for each virtual WWPN is performed to acquire N_Port_ID for each virtual WWPN on the network. Thus, after an N_Port acquires its first N_Port_ID (physical WWPN) through the Fabric Login (FLOGI) procedure set forth in FIG. 3, the N_Port can acquire additional virtual N_Port_IDs (virtual WWPNs) by sending a Fabric Discovery (FDISC) request with a new WWPN and a Source ID (S_ID) of 00 00 00hex. The blank S_ID and new Port_Name signal the name server to assign a new N_Port_ID to the N_Port. The application or operating system on the node behind the new N_Port_ID will need to register its name server information and follow all of the other login processes just as if it were a new N_Port logging into the fabric. Upon receiving the FDISC request, the name server (switch) will typically assign the next consecutive N_Port_ID, although other numbering schemes may be used.

FIG. 4 illustrates the exchange of information between a transmitting party 401 (login requesting party, corresponding to host 120 and storage system 100 in this invention) and the name server 402 (corresponding to switches within SAN 140 in this invention). The procedure illustrated in FIG. 4 is performed via the physical port associated with the virtual WWPN after the login procedure is performed for the physical WWPN of the physical port, as illustrated in FIG. 3 and as described above. The procedure of FIG. 4 is similar to the login procedure for physical WWPN illustrated in FIG. 3.

Step 403: The transmitting party 401 transmits a FDISC request containing fixed D_ID (0xFFFFFE), fixed S_ID (0x000000), and N_Port_Name (virtual WWPN) and Node_Name of the transmitting party. FDISC request is used instead of FLOGI request for virtual WWPN so that the name server 402 can determine that the login request sent from the transmitting party is for a virtual WWPN. Also, with the FDISC request, the transmitting party 401 can request to use an existing N_Port_ID—that is an N_Port_ID assigned through fabric login procedure performed beforehand according to FIG. 4.

Steps 404-405: The name server 402 receives the request and determines the N_Port_ID for the virtual WWPN of transmitting party 401 based on FC_PH.

Step 406: Name server 402 sends back the determined N_Port_ID to the transmitting party 401.

Steps 407-408: After receiving the N_Port_ID, the transmitting party 401 regards the N_Port_ID as its own N_Port_ID, and transmits a PLOGI frame with its own N_Port_ID as S_ID, N_Port_Name (virtual WWPN) and Node_Name to the name server 402.

Steps 409-410: The name server receives the second frame, and the name server 402 sends back a list of D_IDs, N_Port_Names (both physical and virtual WWPNs) and Node_Names of all the accessible destination parties in the network (corresponding to physical and virtual WWPNs on host 120 and storage system 100 in this invention).

Step 411: The transmitting party 401 receives this list and maintains the list showing the correspondence of D_ID and N_Port_Name (physical and virtual WWPNs) for each destination party.

FIG. 27, illustrates a fabric login procedure for a virtual port with an existing N_Port_ID. The procedure of FIG. 4 is used to login to a fabric with a virtual WWPN for the first time, and the procedure of FIG. 27 is used to re-login to the fabric with the same virtual WWPN and N_Port_ID that has been assigned to the virtual WWPN by performing the procedure of FIG. 4 beforehand, typically for the purpose of informing the name server on the switch that a virtual port has been moved to another physical port. Since host computers send requests targeting N_Port_ID (rather than WWPN) of a target port, the host computers Would need to re-login (PLOGI) to the target port and acquire a new N_Port_ID of the target port if the N_Port_ID of the target port is changed. Thus, carrying out the procedure of FIG. 27 can eliminate the need for host computers to have to re-login after a virtual port is moved to another physical port.

Step 2703: The transmitting party 2701 can send FDISC request with existing N_Port_ID set in the S_ID field.

Steps 2704-2706: Name server 2702 receives the FDISC request, and in response to the request, name server 2702 checks if the N_Port_ID is used for another physical or virtual WWPN besides the virtual WWPN in the S_ID field of the FDISC request sent from transmitting party.

Step 2707: When the N_Port_ID is already used for another physical or virtual WWPN, name server 2702 sends back a rejection message to the transmitting party 2701.

Steps 2708-2709: The transmitting party 2701 needs to perform the login procedure illustrated in FIG. 4 to acquire a new N_Port_ID. When a new N_Port_ID is received following the procedure of FIG. 4, the process ends.

Step 2710: On the other hand, if the current virtual WWPN is not used for another WWPN, the name server 2702 sends back the same N_Port_ID and notifies the transmitting party 2701 that the existing N_Port_ID can be used.

Steps 2711-2712: After receiving the N_Port_ID, the transmitting party 2701 regards the N_Port_ID as its own N_Port_ID, and transmits a PLOGI frame with its own N_Port_ID as S_ID, N_Port_Name (physical WWPN) and Node_Name to the name server 2702.

Steps 2713-2714: The name server receives the second frame, and the name server 402 sends back a list of D_IDs, N_Port_Names (both physical and virtual WWPNs) and Node_Names of all the accessible destination parties in the network (corresponding to physical and virtual WWPNs on host 120 and storage system 100 in this invention).

Step 2715: The transmitting party 2701 receives this list and maintains the list showing the correspondence of D_ID and N_Port_Name (physical and virtual WWPNs) for each destination party.

Node Login Procedure

FIG. 26 illustrates the exchange of information between the transmitting party 2601 (login requesting party, corresponding to host 120 in this invention) and the destination party 2602 (login receiving party, corresponding to storage system 100 in this invention). This procedure is common for both physical ports and virtual ports.

The login requesting party (host computer) transmits a PLOGI (port login) frame 2603 to the login receiving party (storage system). This frame contains N_Port_Name (physical WWPN or virtual WWPN), Node_Name, S_ID and other information of the login requesting party. Equipment at the destination takes out the information contained in this frame. When approving the login, this equipment transmits a frame called "ACC" 2604 to the login requesting party. To reject login, on the other hand, it transmits a frame called "LS_RJT" 2605 to the login requesting party.

When detecting the response of the ACC frame to the PLOGI frame transmitted by the login requesting party, the login requesting party knows that login has been successful, and can now start an I/O process such as data transfer. When receiving the LS_RJT frame, on the other hand, the login requesting party knows that login is not established, and I/O processes to the corresponding login receiving party cannot be executed. Though the preceding explanation is given for the login operation of Class 3, the information in other login processes that can be transmitted from the login requesting party to the login receiving party similarly contains N_Port_Name (physical WWPN or virtual WWPN), Node_Name and S_ID.

Virtual Port Management Table

Virtual port manager 201 of the invention manages an association between physical ports and virtual ports using virtual port management table 500, as illustrated in FIG. 5. Virtual port management table 500 includes a group field 501 which is a unique ID or name defined by storage system or administrator. Physical ports and virtual ports in the same group should be in the same fabric. Also included are a physical WWPN field 502 that lists the physical WWPN (hardware address) of the physical port, a status field 506 that indicates the status of the physical port, and a virtual WWPN field 503 that indicates the virtual WWPN created and associated with the physical port. This virtual WWPN is typically created by the storage system so that it will be unique world wide. If this element is NULL, it means the following elements, N_Port_ID 504 and exported volume 505, are for the physical WWPN itself. N_Port_ID 504 is the N_Port_ID acquired through login procedure for each physical and virtual WWPN. Exported volume 505 are the volumes exported with each WWPN.

FIG. 6 is an illustrative conceptual diagram of the port configuration illustrated in the virtual port management table 500 of FIG. 5. WWPN_1 600 and WWPN_2 603 are hardware addresses of FC interfaces 108 and 111, respectively, and N_Port_ID_1 601 and N_Port_ID_2 602 are N_Port_IDs acquired for WWPN_1 600 and WWPN_2 603 respectively through fabric login procedure for each physical port, as described above with respect to FIG. 3. Also, virtual ports with port address of WWPN_V1 604 and WWPN_V2 606 are created and associated with the physical port with WWPN_1 600, and N_Port_ID_V1 605 and N_Port_ID_V2 607 are N_Port_IDs acquired for WWPN_V1 604 and WWPN_V2 606 respectively through fabric login procedure for each virtual port as described above with reference to FIG. 4 or FIG. 27. What is more, volumes VOL_A 608, VOL_B 609, and VOL_C 610 are exported through the virtual port with WWPN_V1 604, and volumes VOL_D 611, VOL_E 612, and VOL_F 613 are exported through the virtual port with WWPN_V2 606. All these addresses and volumes belong to a group named GROUP_1 614.

Limiting Access to Storage Devices

For node login procedure, as discussed above with reference to FIG. 26, information exchanged between the transmitting party 2601 (login requesting party, corresponding to host 120 in this invention) and the destination party 2602 (login receiving party, corresponding to storage system 100 in this invention) is the same for both physical WWPN and virtual WWPN. Therefore, limiting access to storage devices exported through each physical and virtual port can be realized by the same method disclosed in U.S. Pat. No. 6,779,083 B2, which was incorporated by reference above.

Creating Virtual Port

When an administrator of the storage system creates a virtual port on a physical port, first a group of physical ports will be created, and then virtual ports will be created on a physical port in a group. The use of groups ensures that a virtual port will only be moved to another physical port that belongs to the same SAN or fabric as the original physical port. Otherwise, if a virtual port is moved outside a group, hosts may not be able to reach the virtual port after the virtual port is moved to the other physical port. Thus, all the physical ports in a group should belong to the same SAN or fabric. FIG. 7 illustrates a flowchart representing a process for making a group of physical ports.

Step 700: The administrator creates a new group or selects an existing group.

Step 701: The administrator selects physical ports and adds the physical ports to the selected group.

FIG. 8 illustrates a flowchart representing a process for creating virtual ports.

Step 800: The administrator selects a group created in advance.

Step 801: The administrator selects a physical port within the group.

Step 802: The administrator creates virtual ports on the physical port. WWPN for the virtual ports will be determined by storage system or the administrator. WWPN for each virtual port should be unique within the storage system including WWPN for physical ports.

Exporting Volumes

FIG. 9 illustrates a flowchart representing a process for exporting volumes through a virtual port.

Step 900: The administrator selects an existing group.

Step 910: The administrator selects an existing virtual port.

Step 920: The administrator selects volumes to export through the selected virtual port.

Port Failover

When storage system 100 detects a failure of a physical port or a link connected to the physical port, storage system 100 changes the association between virtual ports and physical ports. That is, storage system 100 moves virtual ports from the physical port originally associated with the virtual ports to another physical port so that the virtual ports can be accessed by hosts even after the failure of the original physical port.

Step 1000: Virtual port manager 201 on storage system 100 detects a failure of a physical port or a link connected to the physical port (status="LINK DOWN").

Step 1001: Virtual port manager 201 looks for another functioning physical port within the same group as the physical port that failed. This is accomplished by locating a physical port whose status is "OK".

Step 1002: Virtual port manager 201 determines if another functioning (status="OK") physical port exists in the same group. If another functioning port is found, the process goes to step 1003. Otherwise, the process skips to step 1006.

Step 1003: Virtual port manager 201 selects a working physical port within the same group.

Step 1004: Virtual port manager 201 performs the fabric login procedure described above with reference to FIG. 27 with the existing N_Port_IDs stored in virtual port management table 500 for each virtual WWPN that was formerly associated with the original physical port that failed. The request is sent through the new physical port.

Step 1005: Virtual port manager 201 makes a check as to whether the fabric login procedure for all the virtual ports has succeeded. If there is a virtual port for which fabric login procedure has failed, the process goes back to step 1001, and tries to find another physical port for the virtual port for which fabric login procedure failed. Otherwise, when the fabric login procedure for all the virtual ports being transferred has succeeded, the process goes to step 1006.

Step 1006: virtual port manager 201 modifies the virtual port management table 500 in response to the changes in associations between physical ports and virtual ports made in the preceding steps, and terminates the process.

FIG. 11 illustrates an example configuration of virtual port management table 500 of FIG. 5 after a failure occurs to the physical port having hardware address WWPN_1 (i.e., status 506 is "LINK DOWN"). As a result of the process illustrated in FIG. 10, management table 500 now represents the configuration after the storage system changes the virtual ports WWPN_V1 and WWPN_V2 associated physical port from WWPN_1 to WWPN_2 for so that hosts can access the volumes under WWPN_V1 and WWPN_V2 using the same WWPNs. This configuration is illustrated in FIG. 6B, showing that WWPN_V1 and WWPN_V2 are now associated with physical port WWPN_2.

Second Embodiment—System Configuration

FIG. 12 illustrates an example of an information system which implements a second embodiment of the invention. A storage system 1200 includes the same components as the storage system 100 described above with respect to FIG. 1 for the first embodiments. Accordingly, those components do not need to be described again here.

Storage system 1200 is operably in communication with at least two host computers 1220 and 1230 in the information system of the second embodiments. Each host 1220 and 1230 comprises at least a CPU 1221, a memory 1222, an Ethernet interface 1223, and a FC interface 1224. These components are operably connected to each other via an internal bus 1225. Each host 1220 and 1230 is operably connected for communication to storage system 1200 through the FC interface 1224 via SAN 140. Also, hosts 1220 and 1230 are operably connected for communication to each other through Ethernet interface 1223 via LAN 1250.

Software Modules

As illustrated in FIG. 13, there are three kinds of software modules that may be executed by CPU 103 in memory 104 in the controller 101 of storage system 1200. Volume manager 1301 creates one or more volumes 1304 using one or more physical devices 102 in storage system 1200, and manages the mapping between the volumes 1304 and physical devices 102. Port load monitor 1302 periodically monitors a load on each physical port and updates a physical port load table 1400, discussed further below. Virtual port manager 1303 creates one or more virtual ports under the physical ports in accordance with instructions from the administrator of the storage system 1200. Also, when determined to be necessary, virtual port manager 1303 changes an association between physical ports and virtual ports in accordance with instruction from port load monitor 1302. Virtual port manager 1303 also manages the information using the same virtual port management table 500 as described with reference to FIGS. 5 and 11 in the first embodiments.

Also, there may be two kinds of software modules executed by CPUs 1221 in the memories 1222 in hosts 1220 and 1230. A hypervisor 1310 represents a virtual machine software, which provides multiple virtual server environments (virtual machines, VMs) for OSs such as Windows, Linux, etc. so that multiple OSs can be run on a single server hardware. Also, hypervisor 1310 provides a function for migrating a running virtual machine to another server physical hardware in cooperation with a second hypervisor 1310 running on the other server physical hardware. Hypervisor 1310 further manages which VMs data is stored under which target WWPN on storage system 1200. VMs 1311 provide a virtual server environment to enable well-known operating systems, such as Windows, Linux, etc. to run inside the virtual server environment.

VM-WWPN Mapping Table

Hypervisor 1310 manages correspondence between VMs 1311 and target WWPNs on storage system 1200 using VM-WWPN mapping table 2800 illustrated in FIG. 28. The VM-WWPN mapping table 2800 is shared among hypervisors 1310 on host1 1220 and host2 1230 through LAN 1250. VM-WWPN mapping table 2800 includes a VM field 2801 that indicates an ID or name of a virtual machine. A Target WWPN field 2902 indicates a corresponding WWPN on storage system 1200 through which volumes storing data of the VM corresponding VM are exported.

Physical Port Load Table

FIG. 14 illustrates an example of a data structure of the port load table 1400. Load monitor 1302 on storage system 1200 periodically monitors the load on each physical port and updates the physical port load table 1400. In the embodiment illustrated, IOPS (I/O operations per second) is measured. This may be current IOPS, peak IOPS, or IOPS averaged over a specified period of time. Additionally, other load or performance metrics may be used in place of or in addition to IOPS. Port load table 1400 includes a field for a group 1401, which is the same as group 501 in virtual port management table 500. The value in the group field 501 is copied to group field 1401 when the virtual port management table 500 is modified. A physical WWPN field 1402 indicates WWPN of a physical port, and a load field 1403 indicates the latest load on a corresponding physical port, as determined by load monitor 1302.

Virtual Port Management Table

The same virtual port management table 500, as described above with respect to FIGS. 5 and 11 in the first embodiments, may also be used in the second embodiments. FIG. 15 is an illustrative conceptual diagram of a configuration of the second embodiments before load balancing. All the port addresses, volumes, and associations between them on storage system 1200 are the same as described above with respect to the first embodiment, and initially as illustrated in the virtual port management table of FIG. 5. However, each hypervisor 1310-1, 1310-2 and VMs 1311-1 and 1311-2 also have their own unique WWPNs for themselves. WWPN_3 1525 is a physical port address of FC interface 1224 on host1 1220, and has a N_Port_ID_3 1524 used by hypervisor 1310 on host 1220. Similarly, WWPN_4 1527 on host2 1230 is a physical port address of FC interface 1224 on host2 1230 having N_Port_ID_4 1526. WWPN_V3 and WWPN_V4 1525 are virtual port addresses used by VM_1 1540 and VM_2 1541, respectively, and N_Port_ID_V3 1520 and N_Port_ID_V4 1522 are assigned to WWPN_V3 1521 and WWPN_V4 1523, respectively. Data for VM_1 1311-1 is stored in volumes VOL_A 608, VOL_B 609, and VOL_C 610 exported through WWPN_V1 605 on storage system 1200, and N_Port_ID_V1 is assigned to WWPN_V1 604. Data for VM_2 is stored in volumes VOL_D 611, VOL_E 612, and VOL_F 613 exported through WWPN_V2 606, and N_Port_ID_V2 607 is assigned to WWPN_V2 606. In FIG. 15, VM_1 1311-1 conducts I/O operations 1530 with volumes VOL_A 608, VOL_B 609, and VOL_C 610 exported through WWPN_V1 605, and VM_2 1311-2 conducts I/O operations 1531 with volumes VOL_D 611, VOL_E 612, and VOL_F 613 exported through WWPN_V2 606.

Load Balancing between Ports

FIG. 16 is an illustrative conceptual diagram of load balancing between ports in the arrangement of FIG. 15. When hypervisor 1310-1 migrates a VM that is running on it (in this case VM_2 1311-2), hypervisor 1310-1 suspends the VM (as a result, I/O operations 1531 from the VM will be suspended as indicated by "X" 1600), and hypervisor 1310-1 notifies storage system 1200 of a virtual WWPN in which data of the suspended VM is stored. Then, the storage system 1200 checks the load on each physical port in the storage system 1200. If the load can be balanced, the storage system 1200 switches the association between the notified virtual WWPN and the physical WWPN, as indicated by arrow 1601. After storage system 1200 completes the load balancing process, hypervisor 1310 migrates the VM, as indicated by arrow 1602, and restarts the processing of VM. As a result, I/O from the VM_2 1311-2 will be resumed, as indicated by arrow 1603, from host2 1230.

FIG. 17 illustrates a flowchart representing a process for switching the physical port of a virtual port for carrying out load balancing.

Step 1700: Hypervisor 1310-1 on host1 1220 suspends operation of a VM which is to be migrated to host2 1230 (in this case, VM_2 1311-2 in FIGS. 15 and 16 is to be migrated to host2 1230).

Step 1701: Hypervisor 1310-1 notifies storage system 1200 of the virtual port WWPN to which I/O is suspended (WWPN_V1 605).

Steps 1702-1703: Virtual port manager 1303 on storage system 1200 receives the notification and determines which physical port is correlated with the virtual port WWPN to which I/O has been suspended (WWPN_1 600 in this example). This may be accomplished by referring to the virtual port management table 500. Virtual port manager 1303 then refers to physical port load table 1400 and compares the load on this physical port with loads on other physical ports in the same group.

Step 1704: Virtual port manager 1303 makes a check to determine whether there is any other physical port in the group on which the load is less than that on the physical port corresponding to the virtual port WWPN for which notification was received from hypervisor 1310-1. A threshold value of a predetermined amount can be specified to start load balancing. If there is, the process goes to step 1705. Otherwise, the process goes to step 1708.

Step 1705: Virtual port manager 1303 selects the physical port with the least load.

Step 1706: Virtual port manager 1303 performs a fabric login procedure according to the procedure set forth in FIG. 27 using the existing N_Port_ID (stored in virtual port management table 500) for the virtual WWPN for which notification was received from hypervisor 1310-1. The request is sent through the physical port selected in step 1705 (i.e., the physical port with the least load).

Step 1707: Virtual port manager 1303 modifies the virtual port management table 500 in response to the changes in associations between physical ports and virtual ports made in Steps 1705 and 1706.

Step 1708: Virtual port manager 1303 notifies hypervisor 1310-1 of completion of the load balancing.

Step 1709-1710: Hypervisor 1310-1 receives the notification and migrates the VM suspended in step 1700 (VM_2 1311-2) to host2 1230. This migration of VM can also include transfer of the virtual port WWPN_V4 1523 from physical port WWPN_3 1525 in host1 1220 to physical port WWPN_4 1527 in host2 1230. To accomplish this, host1 1220 identifies the virtual port to be transferred, and then virtual port (WWPN_V4 1523 in this case) is transferred using the procedure set forth in FIG. 27. Then VM_2 1311-2 is migrated to host2 1230, and VM_2 may continue to conduct I/O operations using virtual port WWPN_V4 1526 in host2 and virtual port WWPN_V2 606 in storage system 1200. This continuity in virtual ports enables virtual ports to essentially be assigned to a virtual machine and the volumes used by the virtual machines, thereby simplifying virtual machine migration and physical port load balancing.

FIG. 18 illustrates an example of virtual port management table 500 of FIG. 5 after VM_2 is migrated to host2 1230. As a result of the process illustrated in FIG. 17, the storage system changes the associated physical port from WWPN_1 to WWPN_2 for virtual port WWPN_V2 so that load on physical ports WWPN_1 and WWPN_2 is more balanced. Further, the load balancing procedure set forth above is described as being carried out in the storage system when a virtual machine is being migrated from one host computer to another host computer. Basically, the storage system needs the hosts to suspend I/O from the hosts to the storage system, which gives the storage system time to balance the load on the physical ports. Thus, the storage system performs load-balancing between the physical ports on the occasion of VM migration in the second embodiment because the hypervisor on host needs to suspend I/O operations to the storage system at the time of the VM migration, and the storage system is able to take advantage of the occasion. Thus, load balancing can be carried out at other occasions during which I/O is suspended to the storage system. In an alternative variation, port load monitor 1302 in storage system 1200 can include a specified threshold value for port loads which, when passed, causes port load monitor 1302 to send a notification to a host or a system administrator, which might be a trigger to suspend I/O operations to carry out load balancing in some configurations, and a decision might also then be made as to whether to perform VM migration.

Additionally, it should be noted that load balancing can also be applied in the case of the first embodiment set forth in FIGS. 6A-6B. For example, when port load monitor 1302 shows that a load on a first physical port WWPN_1 600 is substantially more than the load on WWPN_2 602, such as when a certain predetermined threshold is passed, for instance, one of virtual ports WWPN_V1 604 or WWPN_V2 606 can be transferred to another physical port in the storage system, such as WWPN_2 603, using the process set forth above, so that the volumes 608-610 or 611-613 accessed through the virtual port WWPN_V1 604 or WWPN_V2 606, respectively, are then accessed through the second physical port WWPN_2 603. Other variations will also be apparent to those of skill in the art in view of the disclosure.

Third Embodiment—System Configuration

FIG. 19 illustrates an example of an information system that implements a third embodiment of the invention. In this embodiment, a local storage system 1900 is operably connected for communication with a remote storage system 1901. Local storage system 1900 and remote storage system 1901 can include the same hardware components as storage system 100 described above in FIG. 1. However, local storage system 1900 may be connected to remote storage system 1901 via one of the FC interfaces through a remote copy link 1902. Remote copy link 1902 is typically composed of a WAN (Wide Area Network) and a Fibre Channel to Internet Protocol (FC-IP) converter such as an extender.

At least two hosts 1903 and 1904 exist in the system of the third embodiment, although more may exist at each location. A local host computer 1903 is in communication with local storage system 1900 via a local SAN 1905. A remote host computer 1904 is in communication with remote storage system 1901 via a remote SAN 1906. Each host 1903 and 1904 comprises the same components as host 1220 in FIG. 12 described above with reference to the second embodiment. Also, local host 1903 and remote host 1904 are operably connected to each other for communication through an Ethernet interface via a WAN 1907. Local SAN 1905 and remote SAN 1906 are separated in this embodiment. Therefore, local host 1903 and local storage system 1900 are in the same fabric, but they are in a different fabric from remote host 1904 and remote storage system 1901, which are in their own fabric.

Software Modules

As illustrated in FIG. 20, there are three software modules in the memories in each of local and remote storage systems 1900 and 1901. Volume manager 2000 creates one or more volumes 2003 using one or more physical devices in each storage system 1900 and 1901, and manages the mapping between the volumes 2003 and physical devices in each storage system 1900 and 1901. Remote copy manager 2001 creates remote copy groups in accordance with instructions received from an administrator of the respective storage system 1900, 1901. Remote copy manager 2001 manages the remote copy groups using remote copy management table 2100. Virtual port manager 2002 creates one or more virtual ports under physical ports in accordance with instruction from an administrator of the respective local and remote storage system 1900 and 1901. Also, virtual port manager 2002 activates or deactivates virtual ports in accordance with instructions received from remote copy manager 2001.

Additionally, there are two kinds of software modules in the memory in local and remote hosts 1903 and 1904. A hypervisor 2008 is the same as hypervisor 1310 described above with reference to the second embodiment of FIG. 13. A VM 2009 is the same as VM 1311 described above with reference to the second embodiment of FIG. 13.

VM-WWPN Mapping Table

Hypervisor 2008 manages correspondence between VMs 2009 and target WWPNs on local storage system 1900 using the same shared table 2800 as was described above with reference to FIG. 28 in the second embodiment. Table 2800 is shared among hypervisors 2008 on local host 1903 and remote host 1904 through WAN 1907.

Remote Copy Management Table

Virtual port manager 2002 manages association among physical ports, virtual ports, and volumes using a remote copy management table 2100, as illustrated in FIG. 21. Remote copy management table 2100 is shared between local and remote storage systems 1900 and 1901 through remote copy link 2003, and includes a group field 2101 that indicates a unique ID or name of a group, as defined by the storage system or administrator. Also included is an active volume field 2106 that indicates which volumes are currently active for which storage system. An entry of "Local" in this field 2106 indicates that the volumes on local storage system 1900 are active, and an entry of "Remote" indicates that volumes on the remote storage system 1901 are active. Remote copy management table 2100 also includes a virtual WWPN field 2102 that indicates a virtual WWPN created for the group. This WWPN is defined by storage system or administrator. Remote copy management table 2100 also includes a local physical WWPN field 2103 that indicates a physical WWPN (hardware address) of a physical port on local storage system 1900 that is used for accessing volumes under the virtual WWPN on the local storage system 1900, a remote physical WWPN field 2104 that indicates a physical WWPN (hardware address) of a physical port on remote storage system 1901 that will be used for accessing volumes under the virtual WWPN after the volumes are taken over by the remote storage system 1901, a local volume field 2105 that indicates volumes on the local storage system 1900 that are exported through the virtual WWPN, and a remote volume field 2106 that indicates volumes on remote storage system 1901 that are paired with local volumes on local storage system 1900 for receiving remote copy replication (i.e., mirroring). Thus, data in local volumes in local storage system 1900 is continuously copied to the remote volumes in remote storage system 1901 when a replication pair is formed between a local volume and a remote volume. Also, these volumes will be exported through the virtual WWPN on the remote storage system 1901 after management of the volumes is taken over by remote storage system 1901.

FIG. 22 is an illustrative conceptual diagram of the configuration illustrated in remote copy management table 2100 in FIG. 21. In FIG. 22, WWPN_1 2200 and WWPN_2 2201 are hardware addresses of FC interfaces 108 in local and remote storage systems 1900 and 1901, respectively. FC interfaces 111 (not shown in FIG. 22) may be used for the communication link 1902 between storage system 1900 and 1901. WWPN_V1 2202 and WWPN_V2 2203 are virtual WWPNs created on physical WWPN_1 2200. Also, WWPN_3 2221 and WWPN_4 2222 are physical hardware addresses of FC interfaces 1224 on local host 1903 and remote host 1904, respectively. Virtual WWPNs WWPN_V3 2223 and WWPN_V4 2224 are created on WWPN_3 2221 on local host 1903 and used by VM_1 2009-1 and VM_2 2009-2, respectively. Data of VM_1 2009-1 is stored in volumes VOL_A 2204 and VOL_B 2205 exported through WWPN_V1 2202 on local storage system 1900 by I/O operations 2241, and data of VM_2 2226 is stored in volume VOL_C 2206 exported through WWPN_V2 2203 on local storage system 1900 by I/O operations 2242. The volumes in GROUP_1 2210 in local storage system 1900 are mirrored to GROUP_1 2212 in remote storage system 1901 such that VOL_A 2204 forms a replication pair with VOL_D 2207 and VOL_B 2205 forms a replication pair with VOL_E 2208, so that data written to VOL_A 2204 and VOL_B 2205 as primary volumes is continuously copied to VOL_D 2207 and VOL_E 2208 as secondary volumes, respectively, as indicated by arrow 2244. Similarly, the volumes in GROUP_2 2211 in local storage system 1900 are mirrored to volumes in GROUP_2 2213 in remote storage system 1901, so that VOL_C 2206 forms a replication pair with VOL_F 2209, so that data written to VOL_C 2206 as a primary volume is continuously copied to VOL_F 2209 as a secondary volume, as indicated by arrow 2243.

Transferring a Virtual Port to a Remote Storage System

FIG. 23 is an illustrative conceptual diagram of a process for taking over virtual ports from a local storage system to a remote storage system. When hypervisor 2008-1 migrates a VM (e.g., VM_2 in FIG. 23) to remote host 1904, hypervisor 2008-1 suspends processing of VM_2 (as a result, I/O 2242 from VM_2 is suspended, as indicated by "X" 2300), and gives a notification to the local storage system 1900 of the virtual WWPNs on the local storage system through which volumes storing data of the VM are exported. Then, local storage system 1900 swaps the direction of the affected replication pair(s) as indicated by arrow 2301, and performs any necessary synchronization so that the secondary volume in the remote storage system 1901 will become a primary volume, and the primary volume in the local storage system will become a secondary volume in the replication pair. Local storage system 1900 also performs a fabric logout procedure for WWPN_V2. Then, remote storage system 1901 performs fabric login procedure using the procedure described above with reference to FIG. 27 for WWPN_V2 2203 to switch the virtual port WWPN_V2 2203 to the physical port WWPN_2 2201, as indicated by arrow 2302. After completion of those processes in local and remote storage system 1900 and 1901, hypervisor 2008-1 migrates VM_2 2009-2 to remote host 1904, as indicated by arrow 2304, and I/O operations are resumed from VM_2 2009-2 to VOL_F 2209 as the primary volume, as indicated by arrow 2305.

FIG. 24 illustrates a flowchart representing the process for transferring over virtual ports to a remote storage system.

Step 2400: Hypervisor 2008 on local host 1903 suspends a VM which is to be migrated to remote host 1904 (VM_2 2009-2 in the example of FIGS. 22-23).

Step 2401: Hypervisor 2008 notifies local storage system 1900 of virtual WWPN which was accessed by the VM suspended in step 2400 and which now needs to be transferred to the remote storage system 1901.

Step 2402-2403: Virtual port manager 2002 on local storage system 1900 receives the notification and identifies which group the virtual WWPN specified by hypervisor 2008 is in, and lists all the volumes in the group.

Step 2404: Remote copy manager 2001 on local storage system 1900 changes the direction of replication between local volumes and remote volumes (i.e., swaps the remote copy pair so that a volume that was a secondary volume becomes a primary volume and vice versa).

Step 2405: Virtual port manager 2002 sends a LOGO (logout) request for each virtual port in the group to logout each specified virtual port from the fabric of the local SAN 1905. Fabric logout (LOGO) is used by a host or storage system to inform the name server on the FC switch that a particular N_Port_ID is no longer in use in the local fabric. In this case, since the virtual port is to be migrated to a different fabric, a logout of the virtual port should be performed.

Step 2406: Virtual port manager 2002 on local storage system 1900 notifies the remote storage system 1901 of completion of the swapping of remote replication pairs and of the logout from the local fabric for every virtual port in the group.

Step 2407-2408: Virtual port manager 2002 on remote storage system 1901 performs a fabric login procedure, as described above with reference to FIG. 4, for each virtual port in the group. The fabric login procedure of FIG. 4 is used instead of that of FIG. 27 because N_Port_ID is unique only within a particular fabric (SAN), and thus, if the existing N_Port_ID is attempted to be transferred to the remote storage 1901, there is no assurance that it can be re-used in the remote SAN 1906. Accordingly, there in no point in attempting to take over the existing N_Port_ID unless uniqueness of the existing N_Port_ID in the remote SAN is assured.

Step 2409: Virtual port manager 2002 on remote storage system 1901 notifies local storage system 1900 of completion of the fabric login procedure.

Step 2410-2411: Virtual port manager 2002 on local storage system 1900 receives the notification of completion of login for the virtual ports, and notifies hypervisor 2008 of completion of transfer of the virtual ports.

Step 2412-2413: Hypervisor 2008 migrates VM_2 2009-2 suspended in step 2400 to remote host 1904, so that I/O operations from the VM are resumed to the same virtual port as before. This migration of the VM can also include transfer of the virtual port WWPN_V4 2224 from physical port WWPN_3 2221 in local host 1903 to physical port WWPN_4 2222 in remote host 1904. To accomplish this, local host 1903 sends a logout request to the local fabric for the virtual port to be transferred, and then virtual port WWPN_V4 2224 is transferred using the procedure set forth in FIG. 27. Then VM_2 2009-2 is migrated to remote 1904, and VM_2 may continue to conduct I/O operations using virtual port WWPN_V4 2224 in remote host 1904 and virtual port WWPN_V2 2203 in remote storage system 1901. This continuity enables virtual ports to essentially be assigned to a virtual machine and the volumes used by the virtual machines, thereby simplifying virtual machine migration from a local host to a remote host. Thus, it may be seen that the foregoing process enables migration of an operating system or other software using on a virtual machine from a first local host to a second remote host.

The present invention is used for storage systems, storage area network (SAN), and their management software, in particular for managing virtual ports on storage systems. The storage system according to the invention has a function to create and manage virtual ports on physical ports. The storage system is able to change or transfer associations between virtual ports and physical ports when a failure occurs in a physical port or a link connected to the physical port so that host can access volumes under the virtual ports through another physical port. The storage system of the invention is also able to change association between virtual ports and physical ports by taking into account the relative loads on the physical ports. Additionally, the storage system of the invention is able to transfer virtual ports to a remote storage system that will take over the virtual ports, so that virtual machines migrated to a remote location can access their volumes on the remote storage system using the same address that was used on the local storage system.

Thus, it may be seen that the invention provides a storage system that enables creation and management of virtual ports on storage systems. Further, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the above description has been made in an illustrative fashion, and not a restrictive one. Accordingly, the scope of the invention should properly be determined with reference to the appended claims, along with the full range of equivalents to which such claims are entitled.

What is claimed:

1. A storage system comprising:
   a storage controller in communication with one or more storage devices;
   one or more of storage volumes configured from said one or more storage devices, said controller controlling access of input/output (I/O) operations to said one or more volumes;
   a first physical port having a first identifier;
   a second physical port having a second identifier; and
   a first virtual port accessed through said first physical port for accessing a first volume of said one or more volumes as a target of the I/O operations,
   wherein said storage system is configured to maintain a management table which manages associations between said first physical port, said first virtual port and said first volume, and between said second physical port, said first virtual port and said first volume, respectively, and
   wherein said storage system is configured to transfer said first virtual port to said second physical port, so that said first volume is accessed through said first virtual port through the second physical port,
   the storage system further including:
   a second virtual port accessed through said first physical port for accessing a second volume of said one or more volumes,
   wherein said storage system is configured to transfer said first virtual port and said second virtual port upon detection of a failure in the first physical port or a failure in a link to the first physical port,
   wherein said storage system determines that said second physical port is functioning properly prior to said transfer,
   wherein said storage system transfers said first virtual port to said second physical port by sending a first virtual port identifier of the first virtual port and the second identifier of the second physical port to a network device in communication with the storage system via a network, so that the first virtual port is logged in to the network and accessed through the second physical port, whereby said first volume is accessed through said first virtual port through the second physical port, and
   wherein said storage system transfers said second virtual port to said second physical port by sending a second virtual port identifier of the second virtual port and the second identifier of the second physical port to the network device, so that the second virtual port is logged in to the network and accessed through the second physical port, whereby said second volume is accessed through said second virtual port through the second physical port.

2. The storage system according to claim 1,
   wherein said storage system is in communication with a host computer via a Fibre Channel Storage Area Network (FC-SAN), such that said host computer targets the I/O operations to said first volume through said FC-SAN,
   wherein said first virtual port has a first virtual port identifier,
   wherein said storage system transfers the first virtual port to the second physical port by sending a fabric login request to a network device on said FC-SAN, said fabric login request including the first virtual port identifier and the second identifier of the second physical port, and
   wherein said first virtual port identifier was previously assigned to said first virtual port by the network device.

3. The storage system according to claim 2,
wherein said storage system is configured to receive back from the network device a virtual port name to use for identifying the first virtual port accessed through the second physical port.

4. The storage system according to claim 1,
wherein said storage system is configured to measure a first load on said first physical port and a second load on said second physical port,
wherein when said storage system determines that said first load on said first physical port is greater than said second load on said second physical port by a predetermined amount, said storage system transfers said first virtual port to said second physical port by sending a virtual port identifier of the first virtual port and the second identifier of the second physical port to a network device in communication with the storage system via a network, so that the first virtual port is logged in to the network and accessed through the second physical port, whereby said first volume is accessed through said second physical port.

5. The storage system according to claim 4,
wherein said storage system measures the first load on said first physical port and the second load on said second physical port by determining a number of I/O operations directed at each of said first physical port and said second physical port over a period of time.

6. The storage system according to claim 1,
wherein a first virtual machine on a first computer directs first I/O operations to said first volume, and a second virtual machine on the first computer directs second I/O operations to said second volume, said first computer and a second computer being in communication with the storage system through a Fibre Channel (FC) network,
wherein, when said first virtual machine is migrated to said second computer, said storage system is configured to measure a first load on said first physical port and a second load on said second physical port,
wherein when said storage system determines that said first load on said first physical port is greater than said second load on said second physical port by a predetermined amount, said storage system transfers said first virtual port to said second physical port, whereby said first volume is accessed through said second physical port by said first virtual machine on said second computer following migration of said first virtual machine to said second computer.

7. The storage system according to claim 6,
wherein said first computer includes a third physical port and said second computer includes a fourth physical port for connecting the computers to the FC network,
wherein a third virtual port is assigned to the third physical port and used by the first virtual machine for accessing the FC network,
wherein, when the first virtual machine is migrated to the second computer, the first computer transfers the third virtual port to the fourth physical port on the second computer, whereby the first virtual machine accesses the first volume using the third virtual port on said second computer and the first virtual port on the storage system.

8. A storage system comprising:
a storage controller in communication with one or more storage devices;
one or more of storage volumes configured from said one or more storage devices, said controller controlling access of input/output (I/O) operations to said one or more volumes:
a first physical port having a first identifier;
a second physical port having a second identifier; and
a first virtual port accessed through said first physical port for accessing a first volume of said one or more volumes as a target of the I/O operations,
wherein said storage system is configured to maintain a management table which manages associations between said first physical port, said first virtual port and said first volume, and between said second physical port, said first virtual port and said first volume, respectively,
wherein said storage system is configured to transfer said first virtual port to said second physical port, so that said first volume is accessed through said first virtual port through the second physical port,
wherein said storage system is configured to measure a first load on said first physical port and a second load on said second physical port,
wherein when said storage system determines that said first load on said first physical port is greater than said second load on said second physical port by a predetermined amount, said storage system transfers said first virtual port to said second physical port by sending a virtual port identifier of the first virtual port and the second identifier of the second physical port to a network device in communication with the storage system via a network, so that the first virtual port is logged in to the network and accessed through the second physical port, whereby said first volume is accessed through said second physical port,
the storage system further including:
a second virtual port accessed through said first physical port for accessing a second volume of said one or more volumes,
wherein said storage system is configured to transfer said first virtual port to said second physical port for balancing the first load on the first physical port with the second load on the second physical port, and
wherein said second virtual port is not transferred during said load balancing and said second volume remains accessible through said first physical port and said second virtual port.

9. The information system comprising:
a storage system including a storage controller in communication with a plurality of storage devices, with a plurality of storage volumes configured from said plurality of storage devices, said controller controlling I/O operations targeting said volumes;
said storage system including a first physical port having a first identifier, and a second physical port having a second identifier, said storage system being in communication with a Fibre Channel Storage Area Network (FC-SAN) via said first physical port and said second physical port; and
said storage system including a first virtual port accessed through said first physical port for accessing a first volume of said plurality of volumes, and a second virtual port accessed through said first physical port for accessing a second volume of said plurality of volumes,
wherein said storage system is configured to transfer at least one of said first virtual port or said second virtual port to said second physical port, so that at least one of said first volume or said second volume is accessed through said second physical port
the storage system further including:
a first virtual machine on a first computer that directs first I/O operations to said first volume, and a second virtual machine on the first computer that directs second I/O operations to said second volume, said first computer and a second computer being in communication with the storage system through the FC-SAN, wherein, when said first virtual machine is migrated to said second computer, said storage system is configured to measure a first load on said first physical port and a second load on said second physical port, wherein, when said storage system determines that said first load on said first physical port is greater than said second load on said second physical port by a predetermined amount, said storage system transfers said first virtual port to said second physical port, whereby said first volume is accessed through said second physical port by said first virtual machine following migration running on said second computer.

10. The information system according to claim 9, wherein said first computer includes a third physical port and said second computer includes a fourth physical port for connecting the computers to the FC-SAN, wherein a third virtual port is assigned to the third physical port and used by the first virtual machine for accessing the FC-SAN, wherein, when the first virtual machine is migrated to the second computer, the first computer transfers the third virtual port to the fourth physical port on the second computer, whereby the first virtual machine accesses the first volume using the third virtual port on said second computer and the first virtual port on the storage system.

11. An information system comprising:

a first storage system including a first storage controller in communication with one or more first storage devices, with a first storage volume configured from said one or more first storage devices, said first controller controlling I/O operations targeting said first volume, said first storage system including a first physical port in communication with a first Fibre Channel (FC) network via said first physical port, said first storage system including a first virtual port accessed through said first physical port for accessing the first volume; and a second storage system in communication with said first storage system, said second storage system including a second storage controller in communication with one or more second storage devices, with a second storage volume configured from said one or more second storage devices, said second storage system including a second physical port in communication with a second FC network, wherein a replication pair is established between the first volume as a volume and the second volume, such that data that is written to the first volume through said first virtual port on the first storage system is copied to the second volume on the second storage system, wherein when a virtual machine on a first computer in communication with said first FC network is migrated to a second computer in communication with said second FC network, said first and second storage systems are configured to swap the direction of replication, such that data written to said second volume is copied to the first volume, and the first virtual port is transferred from the first physical port on the first storage system to the second physical port on the second storage system, wherein the virtual machine, following migration to the second computer targets the I/O operations to said second volume through said second physical port and said first virtual port on said second storage system.

12. The information system according to claim 11, wherein said first computer includes a third physical port for connecting said first computer to the first FC network and said second computer includes a fourth physical port for connecting the second computer to the second FC network, wherein a second virtual port is assigned to the third physical port and used by the virtual machine for accessing the first FC network prior to migration, wherein, when the virtual machine is migrated to the second computer, the first computer transfers the second virtual port to the fourth physical port on the second computer, whereby the first virtual machine accesses the second volume using the second virtual port on said second computer and the first virtual port on the second storage system.

13. The information system according to claim 11, wherein the first virtual port is transferred from the first physical port on the first storage system to the second physical port on the second storage system by the first storage system identifying the first virtual port to be transferred, and sending a logout request for the first virtual port to the first FC network, wherein the first storage system sends a first virtual port identifier to the second storage system, wherein the second storage system logs the first virtual port into the second FC network by sending first virtual port identifier and a physical port identifier for the second physical port to the second FC network.

14. The information system according to claim 11, wherein the first storage system, the first computer and the first FC network comprise a local system, wherein the second storage system, the second computer and the second FC network comprise a remote system, wherein the first computer is in communication with the second computer via a wide area network (WAN), wherein said virtual machine is migrated from the local system to the remote system over said WAN, and resumes the I/O operations following the migration by directing the I/O operations to the first virtual port and the second volume.

* * * * *